United States Patent
Takebayashi et al.

(10) Patent No.: US 9,080,481 B2
(45) Date of Patent: Jul. 14, 2015

(54) CONSTRUCTION MACHINE HYDRAULIC DRIVE SYSTEM HAVING EXHAUST GAS PURIFYING DEVICE

(71) Applicant: Hitachi Construction Machinery Co., Ltd., Tokyo (JP)

(72) Inventors: Yoshifumi Takebayashi, Koka (JP); Kiwamu Takahashi, Koka (JP); Kazushige Mori, Koka (JP); Natsuki Nakamura, Koka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/237,357

(22) PCT Filed: Oct. 2, 2012

(86) PCT No.: PCT/JP2012/075493
§ 371 (c)(1),
(2) Date: Feb. 6, 2014

(87) PCT Pub. No.: WO2013/051551
PCT Pub. Date: Apr. 11, 2013

(65) Prior Publication Data
US 2014/0165543 A1      Jun. 19, 2014

(30) Foreign Application Priority Data

Oct. 4, 2011    (JP) ................. 2011-220453

(51) Int. Cl.
*F01N 3/00*    (2006.01)
*F01N 3/023*   (2006.01)
(Continued)

(52) U.S. Cl.
CPC ............... *F01N 3/023* (2013.01); *E02F 3/325* (2013.01); *E02F 9/2066* (2013.01);
(Continued)

(58) Field of Classification Search
CPC ..... F02D 41/029; F01N 9/002; F01N 3/0842; F01N 3/035; F01N 13/02
USPC ........... 60/285, 286, 287, 295, 297, 311, 422, 60/452
See application file for complete search history.

(56) References Cited

U.S. PATENT DOCUMENTS

| | | | |
|---|---|---|---|
| 2011/0000197 A1* | 1/2011 | Kamiya et al. | 60/295 |
| 2011/0173958 A1* | 7/2011 | Masuda et al. | 60/285 |

(Continued)

FOREIGN PATENT DOCUMENTS

| | | |
|---|---|---|
| EP | 2354330 A1 * | 8/2011 |
| JP | 07-166840 A | 6/1995 |

(Continued)

OTHER PUBLICATIONS

International Preliminary Report on Patentability received in International Application No. PCT/JP2012/075493 dated Apr. 17, 2014.

*Primary Examiner* — Thomas Denion
*Assistant Examiner* — Patrick Maines
(74) *Attorney, Agent, or Firm* — Mattingly & Malur, PC

(57) ABSTRACT

A construction machine hydraulic drive system that performs load sensing control is capable of efficiently burning and removing deposits on a filter in an exhaust gas purifying device through pump output increasing control and to be free from faults in the pump output increasing control even when an actuator is operated during the pump output increasing control. A solenoid switching valve is switched so that output pressure of an engine speed detecting valve is guided to a pressure receiving portion of an LS control valve and a pressure receiving portion of an unloading valve when a start of regeneration is not directed, and delivery pressure of a pilot pump is guided to the pressure receiving portion and the pressure receiving portion when the start of the regeneration is directed, to thereby disable load sensing control to increase capacity of a main pump and increase set pressure of the unloading valve.

13 Claims, 7 Drawing Sheets

(51) Int. Cl.
  *F02D 29/04* (2006.01)
  *F02D 41/02* (2006.01)
  *F02D 41/40* (2006.01)
  *E02F 9/20* (2006.01)
  *E02F 9/22* (2006.01)
  *F15B 15/18* (2006.01)
  *E02F 3/32* (2006.01)
  *F01N 9/00* (2006.01)
  *F01N 3/025* (2006.01)

(52) U.S. Cl.
  CPC ............ *E02F 9/2228* (2013.01); *E02F 9/2235* (2013.01); *E02F 9/2285* (2013.01); *E02F 9/2296* (2013.01); *F02D 29/04* (2013.01); *F02D 41/029* (2013.01); *F02D 41/406* (2013.01); *F15B 15/18* (2013.01); *F01N 3/0253* (2013.01); *F01N 9/002* (2013.01); *F02D 2200/0812* (2013.01); *Y02T 10/44* (2013.01)

(56) References Cited

U.S. PATENT DOCUMENTS

| | | | |
|---|---|---|---|
| 2012/0227388 A1* | 9/2012 | Asakage et al. | 60/311 |
| 2013/0227936 A1* | 9/2013 | Takahashi et al. | 60/297 |
| 2013/0269320 A1* | 10/2013 | Kwak et al. | 60/274 |
| 2014/0046552 A1* | 2/2014 | Tsuruga et al. | 701/50 |
| 2014/0052350 A1* | 2/2014 | Tsuruga et al. | 701/50 |
| 2014/0290237 A1* | 10/2014 | Yoshida et al. | 60/452 |

FOREIGN PATENT DOCUMENTS

| | | | |
|---|---|---|---|
| JP | 3073380 B2 | | 6/2000 |
| JP | 2001-193705 A | | 7/2001 |
| JP | 2010-077937 A | | 4/2010 |
| JP | 2010-223158 A | | 10/2010 |
| JP | 2011038464 A | * | 2/2011 |

* cited by examiner

CONSTRUCTION MACHINE HYDRAULIC DRIVE SYSTEM HAVING EXHAUST GAS PURIFYING DEVICE

TECHNICAL FIELD

The present invention relates generally to construction machine hydraulic drive systems that are used in construction machines such as hydraulic excavators and perform load sensing control so that delivery pressure of a hydraulic pump is higher by target differential pressure than maximum load pressure of a plurality of actuators. More particularly, the present invention relates to a construction machine hydraulic drive system having an exhaust gas purifying device for purifying particulate matter contained in engine exhaust gases.

BACKGROUND ART

A hydraulic drive system that performs load sensing control so that delivery pressure of a hydraulic pump is higher by target differential pressure than maximum load pressure of a plurality of actuators is called a load sensing system. Patent document 1 discloses an exemplary load sensing system.

The hydraulic drive system disclosed in patent document 1 includes an engine, a variable displacement hydraulic pump, a plurality of actuators, a plurality of flow and directional control valves, a detecting circuit, a control means, and an unloading valve. Specifically, the variable displacement hydraulic pump is driven by the engine. The actuators are driven by hydraulic fluid delivered from the hydraulic pump. The flow and directional control valves control a flow rate of the hydraulic fluid supplied from the hydraulic pump to the actuators. The detecting circuit detects the maximum load pressure of the actuators. The control means performs the load sensing control so that the delivery pressure of the hydraulic pump is higher by target differential pressure than the maximum load pressure of the actuators. The unloading valve is disposed in a line that connects the hydraulic pump to the flow and directional control valves. The unloading valve opens when the delivery pressure of the hydraulic pump is higher than the sum of the maximum load pressure and the unloading set pressure, to thereby return the fluid delivered from the hydraulic pump, thereby limiting an increase in the delivery pressure of the hydraulic pump.

Patent document 2 discloses a load sensing system having an exhaust gas purifying device. The exhaust gas purifying device of this system is disposed in an exhaust pipe and includes an exhaust resistance sensor. When a value detected by the sensor is equal to or higher than a predetermined level, a control device outputs a signal to thereby control a regulator of the main pump and an unloading valve. A delivery rate and a delivery pressure of the hydraulic pump are thereby simultaneously increased to apply hydraulic load to an engine. The output of the engine is thus increased to thereby increase an exhaust gas temperature. An oxidation catalyst is thus activated to thereby burn filter deposits and regenerate the filter.

PRIOR ART REFERENCES

Patent Document

Patent Document 1: JP-2001-193705-A
Patent Document 2: Japanese Patent No. 3073380

SUMMARY OF THE INVENTION

Problem to be Solved by the Invention

The construction machine such as a hydraulic excavator includes a diesel engine as its drive source. Regulations have been being strengthened year after year on a discharge amount of particulate matter (hereinafter referred to as "PM") discharged from the diesel engine, together with, for example, NOx, CO, and HC. To respond to these regulations, a common practice is to mount an exhaust gas purifying device on the diesel engine and to trap the PM with a filter called a diesel particulate filter (DPF) included in the engine exhaust gas purifying device, thereby reducing an amount of PM discharged to the outside. In the exhaust gas purifying device, the filter tends to clog with an increase in a PM trap amount of the filter. This increases discharge pressure of the engine, inducing, for example, aggravation of fuel economy. It is thus necessary to remove deposits on the filter by appropriately burning the PM trapped on the filter and to regenerate the filter.

An oxidation catalyst is generally used for the regeneration of the filter. The oxidation catalyst may be disposed upstream of the filter or directly carried on the filter, or both. In either case, to activate the oxidation catalyst, an exhaust gas temperature needs to be higher than an activating temperature of the oxidation catalyst. This necessitates that the exhaust gas temperature be forcedly increased to a temperature higher than the activating temperature of the oxidation catalyst.

In the hydraulic drive system disclosed in patent document 1, to achieve the load sensing control, the variable displacement main pump has a minimum tilting angle (capacity) and a minimum delivery flow rate when, for example, all operating levers are in their neutral positions. Additionally, the delivery pressure of the main pump is controlled by the unloading valve and is a minimum pressure that is substantially equal to a set pressure of the unloading valve when all of the operating levers are in their neutral positions. As a result, main pump absorption torque is also a minimum.

If an exhaust gas purifying device is mounted on the engine of a hydraulic drive system that performs load sensing control such as that described above, engine load is low and the engine exhaust gas temperature is low when all of the operating levers are in their neutral positions.

When regeneration of the filter in the exhaust gas purifying device is required in the hydraulic drive system disclosed in patent document 2, the exhaust resistance sensor detects this requirement. Then, control is performed to increase the delivery flow rate and the delivery pressure of the main pump simultaneously (hereinafter referred to as pump output increasing control) to thereby apply the hydraulic load to the engine. The output of the engine is thus increased to thereby increase the exhaust gas temperature. The oxidation catalyst is thus activated to thereby burn filter deposits. Even with all of the operating levers in their neutral positions, therefore, the absorption horsepower of the main pump is not reduced and the filter can be regenerated.

The technique disclosed in patent document 2, however, entails a possible fault occurring in the pump output increasing control when an operating lever is used to operate an actuator during the pump output increasing control.

Specifically, in the technique disclosed in patent document 2, under a condition in which the exhaust gas purifying device requires regeneration, the control device outputs a signal to control directly the regulator of the main pump, thereby acquiring a target flow rate Q2, on one hand, the unloading valve is controlled directly by a signal from the control device to thereby acquire a target pressure P2 on the other hand. Thus, when all of the operating levers are in their neutral positions and none of the actuators are operating, the target pressure P2 and the target flow rate Q2 can be acquired and the absorption torque of the main pump can be geared to a target value required for the pump output increasing control.

If an actuator operation is performed during, for example, the pump output increasing control, the hydraulic fluid delivered from the main pump does flow into the actuator. If the flow rate required by the actuator is higher than the target flow rate Q2 of the main pump obtained through the pump output increasing control, however, the delivery pressure of the main pump is reduced to fail to reach the target pressure P2. As a result, the absorption torque of the main pump decreases from an optimum value.

For the foregoing reasons, patent document 2 recommends that the pump output increasing control be performed only when the operating levers are in their neutral positions.

An object of the present invention is to provide a construction machine hydraulic drive system performing load sensing control, the hydraulic drive system being capable of efficiently burning and removing deposits on a filter in an exhaust gas purifying device through pump output increasing control and being free from faults even when an operating lever is used to operate an actuator during the pump output increasing control.

Means for Solving the Problem (1) To achieve the foregoing object, an aspect of the present invention provides a construction machine hydraulic drive system including: an engine; a variable displacement hydraulic pump driven by the engine; a plurality of actuators driven by hydraulic fluid delivered from the hydraulic pump; a plurality of flow and directional control valves that control a flow rate of the hydraulic fluid supplied from the hydraulic pump to the actuators; a pump control device including a torque control section and a load sensing control section, the torque control section performing absorption torque maintaining control that prevents absorption torque of the hydraulic pump from exceeding predetermined maximum torque by reducing capacity of the hydraulic pump as delivery pressure of the hydraulic pump increases and the load sensing control section performing load sensing control that ensures that the delivery pressure of the hydraulic pump is higher than maximum load pressure of the actuators by target differential pressure; an unloading valve connected to a line to which a delivery fluid from the hydraulic pump is guided, the unloading valve opening when the delivery pressure of the hydraulic pump is higher than the sum of the maximum load pressure and the unloading set pressure, to thereby return the delivery fluid of the hydraulic pump to a tank, thus restricting an increase in the delivery pressure of the hydraulic pump; and a pilot pump driven by the engine, the hydraulic drive system comprising: an exhaust gas purifying device that purifies exhaust gases from the engine; an instruction device that directs a start of regeneration of the exhaust gas purifying device; and a changeover control device that selects to enable or disable the load sensing control performed by the load sensing control section by enabling the load sensing control of the load sensing control section when the instruction device does not direct the start of the regeneration of the exhaust gas purifying device and disabling the load sensing control of the load sensing control section when the instruction device directs the start of the regeneration of the exhaust gas purifying device to thereby increase the capacity of the hydraulic pump; when disabling the load sensing control, by guiding predetermined pressure generated based on the delivery fluid of the pilot pump to the unloading valve to thereby increase the unloading set pressure.

The aspect of the present invention having the arrangements described above achieves the following operations.

Operation 1

When the exhaust gas purifying device does not require regeneration and the instruction device does not direct the start of the regeneration of the exhaust gas purifying device, the changeover control device enables the load sensing control by the load sensing control section. This allows the load sensing control to be performed as usual so that the delivery pressure of the hydraulic pump is higher than the maximum load pressure of the actuators by the target differential pressure. Additionally, the predetermined pressure generated based on the delivery fluid of the pilot pump is not guided to the unloading valve. The unloading valve then operates as usual to open when the delivery pressure of the hydraulic pump is higher than the sum of the maximum load pressure and the unloading set pressure, to thereby return the delivery fluid of the hydraulic pump to the tank and restricts an increase in the delivery pressure of the hydraulic pump.

When the exhaust gas purifying device requires the regeneration as a result of an increased amount of PM deposited on the filter of the exhaust gas purifying device and the instruction device directs the start of the regeneration of the exhaust gas purifying device, the changeover control device disables the load sensing control by the load sensing control section to thereby increase a delivery flow rate of the hydraulic pump. The changeover control device further guides the predetermined pressure generated based on the delivery fluid of the pilot pump to the unloading valve to thereby increase the unloading set pressure. The delivery flow rate of the hydraulic pump and the unloading set pressure being controlled so as to increase as described above cause the delivery pressure of the hydraulic pump to be maintained at a level that is a sum of the maximum load pressure of the actuators, the unloading set pressure of the unloading valve, and pressure determined by an override characteristic of the unloading valve and the capacity of the hydraulic pump to increase within a range of the absorption torque maintaining control by the torque control section. Thus, by setting the predetermined pressure to an appropriate value, the delivery pressure of the hydraulic pump can be increased up to a level near starting pressure of the absorption torque maintaining control (preferably higher than the starting pressure of the absorption torque maintaining control), so that the absorption torque of the hydraulic pump can be increased up to maximum torque of the absorption torque maintaining control by the torque control section. Specifically, pump output increase increasing control (pump absorption torque increasing control) using the absorption torque maintaining control by the torque control section can be performed.

The increase in the absorption torque of the hydraulic pump results in increased load on the engine and an increased exhaust temperature. This activates an oxidation catalyst of the exhaust gas purifying device. Thus, supply of unburned fuel to the exhaust gas causes the activated oxidation catalyst to burn the unburned fuel, resulting in an increased exhaust gas temperature. The resultant exhaust gas at high temperature burns and removes the PM deposited on the filter.

Operation 2

During the pump output increasing control, the delivery pressure of the hydraulic pump is close to the starting pressure of the absorption torque maintaining control as described above and the delivery flow rate of the hydraulic pump is, or is close to, a maximum flow rate. Meanwhile, most of the actuators have a maximum flow rate requirement set lower than the maximum flow rate of the hydraulic pump. When an actuator is operated during the pump output increasing control, therefore, an excess of the delivery flow rate of the hydraulic pump is produced and the excess is returned to the tank via the unloading valve. Thus, the delivery pressure of the hydraulic pump increases according to the load pressure of the actuator because of functioning of the unloading valve. Therefore, at this time, too, the absorption torque maintaining control by the torque control section controls to keep the absorption torque of the hydraulic pump below the maximum torque. The same pump absorption torque increasing control as that before the actuator is operated can thus be performed without being affected by the actuator operation.

Operation 3

In a construction machine, such as a hydraulic excavator, the flow rate requirement for a track motor during steady state traveling or the flow rate requirement when the actuators are simultaneously operated with operating levers for a front system in, for example, excavating work may at times be greater than the delivery flow rate of the hydraulic pump during the pump output increasing control. However, the load pressure during traveling or the load pressure for combined operations involving the front system in which the flow rate requirement is greater than the delivery flow rate of the hydraulic pump during the pump output increasing control is high, so that the delivery pressure of the hydraulic pump is higher than the starting pressure of the absorption torque maintaining control. Thus, in this case, too, the absorption torque of the hydraulic pump is controlled so as not to exceed the maximum torque by the absorption torque maintaining control by the torque control section. The same pump output increasing control as that before the actuators are operated can thus be performed without being affected by the actuator operation.

Summary of Operations—Effect

As described above, deposits on the filter in the exhaust gas purifying device can be efficiently burned and removed through the pump output increasing control. Even when an operating lever is used to operate an actuator during the pump output increasing control, a fault can be prevented from occurring in the pump output increasing control.

(2) In (1) above, preferably, the construction machine hydraulic drive system further comprises: a pilot hydraulic source connected to the pilot pump, the pilot hydraulic source generating pilot primary pressure based on the delivery fluid of the pilot pump; and an engine speed detecting valve disposed between the pilot pump and the pilot hydraulic source, the engine speed detecting valve generating a hydraulic signal dependent on a speed of the engine based on the delivery fluid of the pilot pump, wherein the load sensing control section of the pump control device includes an LS control valve that includes a first pressure receiving portion to which the hydraulic signal of the engine speed detecting valve is guided, the first pressure receiving portion being operative in a direction in which pump capacity increases to thereby set target differential pressure of the load sensing control using the hydraulic signal, the unloading valve includes a spring operative in a closing direction and a pressure receiving portion operative in a closing direction to cooperate with the spring and set the unloading set pressure, and the changeover control device guides the hydraulic signal generated by the engine speed detecting valve to the pressure receiving portion of the unloading valve when the instruction device does not direct the start of the regeneration of the exhaust gas purifying device, and guides the delivery pressure of the pilot pump to the pressure receiving portion of the unloading valve as the predetermined pressure when the instruction device directs the start of the regeneration of the exhaust gas purifying device.

This achieves the following effect. Specifically, when the start of the regeneration is directed, the delivery pressure of the pilot pump is guided as the predetermined pressure to the pressure receiving portion of the unloading valve to thereby increase the unloading set pressure. This eliminates the need for a dedicated hydraulic device for generating the predetermined pressure. The hydraulic drive system can thus have simple arrangements and be achieved at low cost.

In addition, the unloading pressure of the unloading valve is set to be divided between the spring and the pressure receiving portion. This achieves an effect of improved cold engine startability.

(3) In (2) above, preferably, the construction machine hydraulic drive system further comprises: a differential pressure reducing valve that generates and outputs differential pressure between the delivery pressure of the hydraulic pump and the maximum load pressure, with the hydraulic pressure of the pilot hydraulic source as a primary pressure, as an absolute pressure to the pump control device, wherein the LS control valve further includes a second pressure receiving portion operative in a direction in which the pump capacity decreases, the second pressure receiving portion receiving the absolute pressure output from the differential pressure reducing valve guided thereto, and when the instruction device directs the start of the regeneration of the exhaust gas purifying device, the changeover control device guides the delivery pressure of the pilot pump instead of the hydraulic signal of the engine speed detecting valve to the first pressure receiving portion of the LS control valve to thereby disable the load sensing control, thus controlling to increase the capacity of the hydraulic pump.

Thus, a simple structure that simply allows the delivery pressure of the pilot pump to be guided to the first pressure receiving portion of the LS control valve, the first pressure receiving portion being operative in the direction in which the pump capacity increases, can disable the load sensing control and increases the capacity of the hydraulic pump. The hydraulic drive system can thus be simply structured and achieved at low cost.

(4) In (3) above, preferably, the changeover control device includes a single switching valve that changes a position thereof so that, when the instruction device does not direct the start of the regeneration of the exhaust gas purifying device, the hydraulic signal of the engine speed detecting valve is guided to the first pressure receiving portion of the LS control valve and the pressure receiving portion of the unloading valve and, when the instruction device directs the start of the regeneration of the exhaust gas purifying device, the delivery pressure of the pilot pump is guided to the first pressure receiving portion of the LS control valve and the pressure receiving portion of the unloading valve.

Thus, a simple structure that switches only one switching valve enables switching from normal control to the pump absorption torque increasing control. The hydraulic drive system can thus be simply structured and achieved at low cost.

(5) Additionally, in (1) to (4) above, preferably, the construction machine hydraulic drive system further comprises: a pressure detecting device that detects exhaust resistance in the exhaust gas purifying device, wherein the instruction device directs the start of the regeneration of the exhaust gas purifying device when the exhaust resistance of the exhaust gas purifying device detected by the pressure detecting device exceeds a threshold value.

When the amount of PM deposited on the filter in the exhaust gas purifying device increases and the exhaust resistance in the exhaust gas purifying device exceeds the threshold value, the pump output increasing control is automatically started to regenerate the exhaust gas purifying device. Convenience of the hydraulic drive system can thus be improved.

(6) Additionally, in (1) to (5) above, preferably, the torque control section of the pump control device is configured so as to control the capacity of the hydraulic pump so that, with characteristics set in advance, the characteristics indicating a relation between the delivery pressure and the capacity of the hydraulic pump and comprising a maximum capacity maintaining characteristic and a maximum absorption torque maintaining characteristic, when the delivery pressure of the hydraulic pump is equal to, or lower than, a first value as pressure at a transition point from the maximum capacity maintaining characteristic to the maximum absorption torque maintaining characteristic, the maximum capacity of the hydraulic pump is made to remain constant even when the delivery pressure of the hydraulic pump increases, and when the delivery pressure of the hydraulic pump increases to exceed the first value, the maximum capacity of the hydraulic pump decreases according to the maximum absorption torque maintaining characteristic, and the predetermined pressure is set so that a sum of the unloading set pressure of the unloading valve increased by the predetermined pressure and pressure generated by the override characteristic of the unloading valve is a value equal to, or greater than, pressure near the transition point from the maximum capacity maintaining characteristic to the maximum absorption torque maintaining characteristic.

This enables the pump output increasing control using the absorption torque maintaining control by the torque control section to be reliably performed when the start of the regeneration is directed, so that the deposits on the filter in the exhaust gas purifying device can be efficiently burned and removed.

Effects of the Invention

In the aspect of the present invention, in the hydraulic drive system that performs the load sensing control, the deposits on the filter in the exhaust gas purifying device can be efficiently burned and removed through the pump output increasing control. In addition, even when an operating lever is used to operate an actuator during the pump output increasing control, a fault can be prevented from occurring in the pump output increasing control.

MODES FOR CARRYING OUT THE INVENTION

An embodiment of the present invention will be described below with reference to the accompanying drawings.

Arrangements

Figure 1:
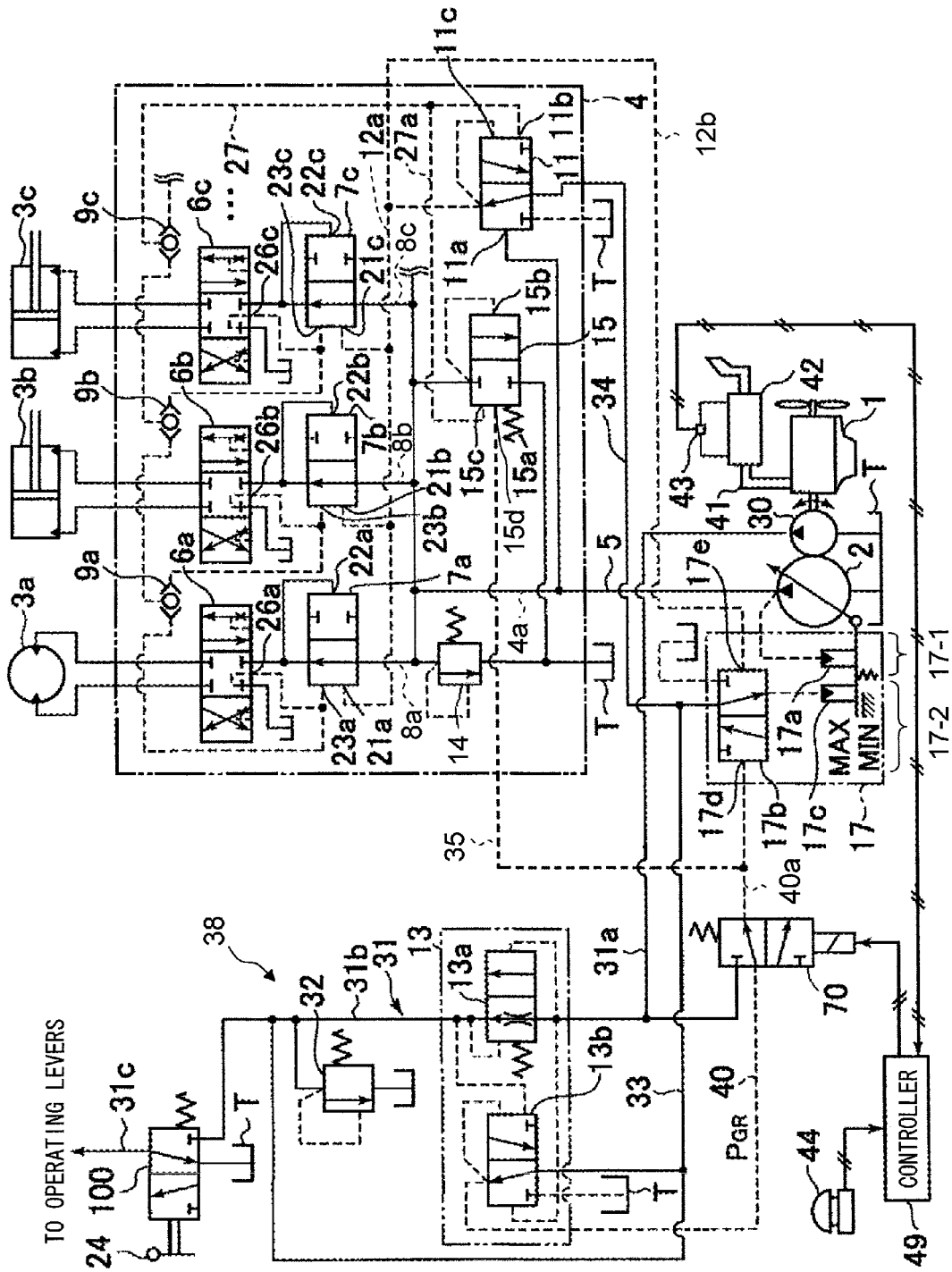
FIG. 1 is a diagram showing arrangements of a hydraulic drive system according to an embodiment of the present invention.

FIG. 1 is a diagram showing arrangements of a hydraulic drive system according to an embodiment of the present invention. This embodiment represents the present invention applied to a hydraulic drive system of a front swing type hydraulic excavator.

In FIG. 1, the hydraulic drive system according to this embodiment includes an engine 1, a variable displacement hydraulic pump as a main pump (hereinafter referred to as a main pump) 2, a fixed displacement pilot pump 30, a plurality of actuators 3a, 3b, 3c ..., a control valve 4, a pump control device 17, a pilot hydraulic source 38, an engine speed detecting valve 13, and a gate lock valve 100. Specifically, the main pump 2 and the pilot pump 30 are driven by the engine 1. The actuators 3a, 3b, 3c ... are driven by hydraulic fluid delivered from the main pump 2. The control valve 4 is disposed between the main pump 2 and the actuators 3a, 3b, 3c .... The pump control device 17 includes a torque control section 17-1 and a load sensing control section 17-2. The torque control section 17-1 performs absorption torque maintaining control that prevents absorption torque of the main pump 2 from exceeding predetermined maximum torque by reducing capacity of the main pump 2 as delivery pressure of the main pump 2 increases. The load sensing control section 17-2 performs load sensing control that ensures that the delivery pressure of the main pump 2 is higher than maximum load pressure of the actuators 3a, 3b, 3c ... by target differential pressure (target LS differential pressure). The pilot hydraulic source 38 is connected to the pilot pump 30 via a pilot line 31 and generates pilot primary pressure based on a delivery fluid of the pilot pump 30. The engine speed detecting valve 13 is disposed between the pilot hydraulic source 38 and the pilot pump 30 and outputs a hydraulic signal dependent on a speed of the engine 1 as an absolute pressure Pgr based on a delivery flow rate of the pilot pump 30 proportional to the engine speed. The gate lock valve 100 is disposed downstream of the pilot hydraulic source 38 and serves as a safety valve operated by a gate lock lever 24.

The actuators 3a, 3b, 3c are, for example, a turning motor, a boom cylinder, and an arm cylinder, respectively. Flow and directional control valves 6a, 6b, 6c are, for example, for a turning motion, a boom, and an arm, respectively. For convenience sake, a bucket cylinder, a boom swing cylinder, track motors, and other actuators, and flow and directional control valves associated with these actuators are not shown in the figure.

The control valve 4 includes the closed-center flow and directional control valves 6a, 6b, 6c ..., pressure compensating valves 7a, 7b, 7c ..., shuttle valves 9a, 9b, 9c ..., a differential pressure reducing valve 11, a main relief valve 14, and an unloading valve 15. Specifically, the flow and directional control valves 6a, 6b, 6c ... are connected to a second hydraulic fluid supply line 4a (internal line) connected to a first hydraulic fluid supply line 5 (piping) to which hydraulic fluid from the main pump 2 is supplied and lines 8a, 8b, 8c ... that branch from the second hydraulic fluid supply line 4a. The flow and directional control valves 6a, 6b, 6c ... control a flow rate and a direction of the hydraulic fluid supplied from the main pump 2 to the actuators 3a, 3b, 3c .... The pressure compensating valves 7a, 7b, 7c ... are connected to the lines 8a, 8b, 8c ... at positions upstream of the flow and directional control valves 6a, 6b, 6c ... and control differential pressure across meter-in throttle portions of the flow and directional control valves 6a, 6b, 6c .... The shuttle valves 9a, 9b, 9c ... select and output a maximum pressure (maximum load pressure) of load pressures of the actuators 3a, 3b, 3c .... The differential pressure reducing valve 11 outputs a differential pressure between the delivery pressure of the main pump 2 and the maximum load pressure as an absolute pressure to signal hydraulic lines 12a, 12b. The main relief valve 14 is connected to the second hydraulic fluid supply line 4a and ensures that pressure (the delivery pressure of the main pump 2) of the second hydraulic fluid supply line 4a does not reach and exceed a set pressure. The unloading valve 15 is connected to the second hydraulic fluid supply line 4a to which the delivery fluid from the main pump 2 is guided. The unloading valve 15 opens when the delivery pressure of the main pump 2 is higher than the sum of the maximum load pressure and an unloading set pressure, to thereby return the delivery fluid of the main pump 2 to a tank T and restricts an increase in the delivery pressure of the main pump 2.

The flow and directional control valves 6a, 6b, 6c . . . have load ports 26a, 26b, 26c . . . , respectively. The load ports 26a, 26b, 26c . . . communicate with the tank T and output a tank pressure as the load pressure when the flow and directional control valves 6a, 6b, 6c . . . are in their neutral positions. When the flow and directional control valves 6a, 6b, 6c . . . are placed in the left or right operating positions shown in the figure from the neutral positions, the load ports 26a, 26b, 26c . . . communicate with the respective actuators 3a, 3b, 3c . . . and output the load pressures of the actuators 3a, 3b, 3c . . . .

The shuttle valves 9a, 9b, 9c . . . are connected in a tournament form and, together with the load ports 26a, 26b, 26c . . . , constitute a maximum load pressure detecting circuit. Specifically, the shuttle valve 9a selects and outputs the high-pressure side of the pressure of the load port 26a of the flow and directional control valve 6a and the pressure of the load port 26b of the flow and directional control valve 6b; the shuttle valve 9b selects and outputs the high-pressure side of the output pressure of the shuttle valve 9a and the pressure of the load port 26c of the flow and directional control valve 6c; and the shuttle valve 9c selects and outputs the high-pressure side of the output pressure of the shuttle valve 9b and the output pressure of another similar shuttle valve not shown. The shuttle valve 9c assumes the shuttle valve at the last stage and its output pressure is guided as the maximum load pressure to the differential pressure reducing valve 11 and the unloading valve 15 via signal hydraulic lines 27, 27a.

The differential pressure reducing valve 11 generates, as an absolute pressure, a differential pressure between the delivery pressure of the main pump 2 and the maximum load pressure using the pressure of the pilot hydraulic source 38 guided via lines 33, 34 as a source pressure (primary pressure). The differential pressure reducing valve 11 includes a pressure receiving portion 11a to which the delivery pressure of the main pump 2 is guided, a pressure receiving portion 11b to which the maximum load pressure is guided, and a pressure receiving portion 11c to which the output pressure of the differential pressure reducing valve 11 is guided.

The pressure compensating valves 7a, 7b, 7c . . . include pressure receiving portions 21a, 21b, 21c . . . and pressure receiving portions 22a, 23a, 22b, 23b, 22c, 23c . . . . Specifically, the pressure receiving portions 21a, 21b, 21c . . . are operative in an opening direction. The output pressure of the differential pressure reducing valve 11 is guided to the pressure receiving portions 21a, 21b, 21c . . . as a target compensating differential pressure thereof via the signal hydraulic line 12a. The pressure receiving portions 22a, 23a, 22b, 23b, 22c, 23c . . . detect the differential pressure across the meter-in throttle portions of the flow and directional control valves 6a, 6b, 6c . . . . The pressure compensating valves 7a, 7b, 7c . . . control so that the differential pressure across the meter-in throttle portions of the flow and directional control valves 6a, 6b, 6c . . . equals the output pressure of the differential pressure reducing valve 11 (a differential pressure between the delivery pressure of the main pump 2 and the maximum load pressure of the actuators 3a, 3b, 3c . . . ). Specifically, the pressure compensating valves 7a, 7b, 7c each have a target compensating differential pressure set to be equal to the differential pressure between the delivery pressure of the main pump 2 and the maximum load pressure of the actuators 3a, 3b, 3c . . . .

The unloading valve 15 includes a spring 15a, a pressure receiving portion 15b, a pressure receiving portion 15c, and a pressure receiving portion 15d. Specifically, the spring 15a is operative in a closing direction to set a cracking pressure Pun0 of the unloading valve. The pressure receiving portion 15b is operative in an opening direction to receive the pressure of the second hydraulic fluid supply line 4a (the delivery pressure of the main pump 2) guided thereto. The pressure receiving portion 15c is operative in a closing direction to receive the maximum load pressure guided thereto via the signal hydraulic line 27a. The pressure receiving portion 15d is operative in a closing direction to receive pressure of a signal hydraulic line 35 (to be described later) guided thereto and cooperate with the spring 15a to set a target unloading pressure. The unloading valve 15 opens when the pressure of the hydraulic fluid supply line 4a is the sum of the maximum load pressure and the set pressure Pun0 of the spring 15a and the pressure of the signal hydraulic line 35 guided to the pressure receiving portion 15d (the unloading set pressure, specifically, the target unloading pressure) or higher, to thereby return the hydraulic fluid of the hydraulic fluid supply line 4a to the tank T and restricts an increase in the pressure of the hydraulic fluid supply line 4a (see FIG. 1).

The pilot line 31 includes a line 31a, a line 31b, and a line 31c. Specifically, the line 31a connects the pilot pump 30 to the engine speed detecting valve 13. The line 31b connects the engine speed detecting valve 13 to the gate lock valve 100. The line 31c is disposed downstream of the gate lock valve 100. The lines 31a, 31b, 31c will hereinafter be referred to as pilot lines 31a, 31b, 31c, respectively, as appropriate.

The pilot hydraulic source 38 includes a pilot relief valve 32 connected to the pilot line 31b. The pilot relief valve 32 keeps pressure of the pilot line 31b constant. The gate lock valve 100 is placed in a position at which the pilot line 31c is connected to the pilot line 31b or a position at which the pilot line 31c is connected to the tank T, as operated by the gate lock lever 24.

Operating lever devices 122, 123 (see FIG. 2) are connected to the pilot line 31c. The operating lever devices 122, 123 generate command pilot pressures (command signals) for operating the flow and directional control valves 6a, 6b, 6c . . . to thereby operate respective actuators 3a, 3b, 3c . . . . When the gate lock lever 24 is operated so that the pilot line 31c is connected to the pilot line 31b, the operating lever devices 122, 123 generate the command pilot pressures (command signals) according to an operating amount of each of the operating levers with the hydraulic pressure of the pilot hydraulic source 38 as a primary pressure. When the gate lock valve 100 is placed in the position at which the pilot line 31c is connected to the tank T, the operating lever devices 122, 123 are disabled and unable to generate the command pilot pressures even with the operating levers operated.

The engine speed detecting valve 13 includes a variable throttle valve 13a and a differential pressure reducing valve 13b. Specifically, the variable throttle valve 13a has an inlet side connected to the pilot line 31a and an outlet side connected to the pilot line 31b. The variable throttle valve 13a has a variable throttle amount according to the delivery flow rate from the pilot pump 30. The differential pressure reducing valve 13b outputs a differential pressure across the variable throttle valve 13a as the absolute pressure Pgr. The delivery flow rate of the pilot pump 30 varies with the engine speed, so that the differential pressure across the variable throttle valve 13a also varies with the engine speed. As a result, the absolute pressure Pgr output from the differential pressure reducing valve 13b varies with the engine speed. The output pressure of the differential pressure reducing valve 13b (the absolute pressure of the differential pressure across the variable throttle valve 13a) is guided via a signal hydraulic line 40, as the target differential pressure (the target LS differential pressure) for the load sensing control, to the pump control device 17 that controls the tilting angle (capacity or displacement volume) of the main pump 2. This improves a saturation phenomenon according to the engine speed, so that good fine operability can be achieved when the engine speed is set low. JP-1998-196604-A gives a detailed description in this respect.

In the pump control device 17, the torque control section 17-1 includes a torque control tilting piston 17a to which the delivery pressure of the main pump 2 is guided. The torque control tilting piston 17a reduces the tilting angle of the main pump 2 as the delivery pressure of the main pump 2 increases, thereby preventing the absorption torque (input torque) of the main pump 2 from exceeding predetermined maximum torque using a spring not shown. This keeps the absorption torque of the main pump 2 below limiting torque of the engine 1 (limiting torque TEL shown in FIG. 3), thereby limiting horsepower consumption of the main pump 2 and preventing the engine 1 from stalling (engine stall) due to overload.

The load sensing control section 17-2 includes an LS control valve 17b and an LS control tilting piston 17c. The LS control valve 17b includes a pressure receiving portion 17d and a pressure receiving portion 17e that are opposed to each other. The pressure receiving portion 17d is operative in a direction in which pump capacity increases, while the pressure receiving portion 17e is operative in a direction in which pump capacity decreases. The pressure receiving portion 17d receives the output pressure of the differential pressure reducing valve 13b of the engine speed detecting valve 13 guided thereto via the signal hydraulic line 40 as the target differential pressure (the target LS differential pressure) for the load sensing control. The pressure receiving portion 17e receives the output pressure of the differential pressure reducing valve 11 (the absolute pressure of the differential pressure between the delivery pressure of the main pump 2 and the maximum load pressure) guided thereto via the signal hydraulic line 12b. The LS control valve 17b varies the tilting angle of the main pump 2 so that the delivery pressure of the main pump 2 is higher than the maximum load pressure by the output pressure (target differential pressure) of the differential pressure reducing valve 13b as follows. Specifically, when the output pressure of the differential pressure reducing valve 11 is higher than the output pressure of the differential pressure reducing valve 13b, the LS control valve 17b guides the pressure of the pilot hydraulic source 38 to the LS control tilting piston 17c via the line 33, thereby reducing the tilting angle of the main pump 2. When the output pressure of the differential pressure reducing valve 11 is lower than the output pressure of the differential pressure reducing valve 13b, the LS control valve 17b brings the LS control tilting piston 17c into communication with the tank T, thereby increasing the tilting angle of the main pump 2. As described above, the LS control valve 17b and the LS control tilting piston 17c perform the load sensing control so that delivery pressure Pd of the main pump 2 is higher than maximum load pressure PLmax of the actuators 3a, 3b, 3c . . . by the target differential pressure.

The hydraulic drive system according to the embodiment further includes the following arrangements in addition to those described above.

Specifically, the hydraulic drive system according to this embodiment further includes an exhaust gas purifying device 42, an exhaust resistance sensor 43, a forced regeneration switch 44, a solenoid switching valve 70, and a controller 49 (control device). Specifically, the exhaust gas purifying device 42 is disposed in an exhaust line 41 that forms part of an exhaust system of the engine 1. The exhaust resistance sensor 43 detects exhaust resistance in the exhaust gas purifying device 42. The forced regeneration switch 44 issues a command for forcedly regenerating the exhaust gas purifying device 42. The solenoid switching valve 70 is disposed in the signal hydraulic line 40 that guides the output pressure Pgr of the differential pressure reducing valve 13b of the engine speed detecting valve 13 to the pressure receiving portion 17d of the LS control valve 17b. The solenoid switching valve 70 switches between the output pressure Pgr of the differential pressure reducing valve 13b and the pressure of the pilot line 31a (the delivery pressure of the pilot pump 30) and outputs either one of the foregoing pressure to a signal hydraulic line 40a that leads to the pressure receiving portion 17d of the LS control valve 17b. The controller 49 receives inputs of a detection signal of the exhaust resistance sensor 43 and a command signal of the forced regeneration switch 44 to perform predetermined calculations and outputs an electric signal for switching the solenoid switching valve 70.

The exhaust gas purifying device 42 has a filter built therein and uses the filter to trap particulate matter (PM) contained in the exhaust gas. The exhaust gas purifying device 42 further includes an oxidation catalyst. When the exhaust gas temperature increases to a predetermined value or higher, the oxidation catalyst is activated. The exhaust gas purifying device 42 burns with the activated oxidation catalyst unburned fuel added to the exhaust gas to increase the exhaust gas temperature, thereby efficiently burning and removing deposited PM trapped on the filter.

The exhaust resistance sensor 43 is an exemplary differential pressure detecting device that detects a downstream and upstream differential pressure across the filter of the exhaust gas purifying device 42 (exhaust resistance of the exhaust gas purifying device 42).

The signal hydraulic line 35 that guides pressure to the pressure receiving portion 15d of the unloading valve 15 is connected to the signal hydraulic line 40a. When the solenoid switching valve 70 is placed in the position shown in the figure, the output pressure Pgr of the differential pressure reducing valve 13b output to the signal hydraulic line 40a is guided to both the pressure receiving portion 17d of the LS control valve 17b and the pressure receiving portion 15d of the unloading valve 15. When the solenoid switching valve 70 is switched from the position shown in the figure, the pressure of the pilot line 31a (the delivery pressure of the pilot pump 30) output to the signal hydraulic line 40a is guided to both the pressure receiving portion 17d of the LS control valve 17b and the pressure receiving portion 15d of the unloading valve 15. Thus, when the solenoid switching valve 70 is placed in the position shown in the figure, the output pressure Pgr of the differential pressure reducing valve 13b is set as the target differential pressure for the load sensing control and the set pressure Pun0 of the spring 15a added to the output pressure Pgr of the differential pressure reducing valve 13b is set as the target unloading pressure of the unloading valve 15. When the solenoid switching valve 70 is switched from the position shown in the figure, the delivery pressure of the pilot pump 30 is guided to the pressure receiving portion 17d of the LS control valve 17b. Thus, the load sensing control by the LS control valve 17b is disabled and the capacity of the main pump 2 is increased (this control will be described later) and the set pressure Pun0 of the spring 15a added to the delivery pressure of the pilot pump 30 is set as the target unloading pressure of the unloading valve 15.

Exemplarily, the pressure of the pilot hydraulic source 38 (pressure of the pilot line 31b) is 4.9 MPa, the output pressure Pgr of the differential pressure reducing valve 13b is 2.0 MPa, the delivery pressure of the pilot pump 30 (the pressure of the pilot line 31a) is 4.9 MPa plus 2.0 MPa, specifically, 6.9 MPa. The set pressure Pun0 of the spring 15a of the unloading valve 15 is 1 MPa. In this case, when the solenoid switching valve 70 is placed in the position shown in the figure, 2.0 MPa is set for the target differential pressure for the load sensing control and the sum of 2.0 MPa and 1.0 MPa, specifically, 3.0 MPa is set for the target unloading pressure of the unloading valve 15. When the solenoid switching valve 70 is switched from the position shown in the figure, a pressure of 6.9 MPa is guided to the pressure receiving portion 17d of the LS control valve 17b and the sum of 6.9 MPa and 1.0 MPa, specifically, 7.9 MPa is set for the target unloading pressure of the unloading valve 15.

Figure 2:
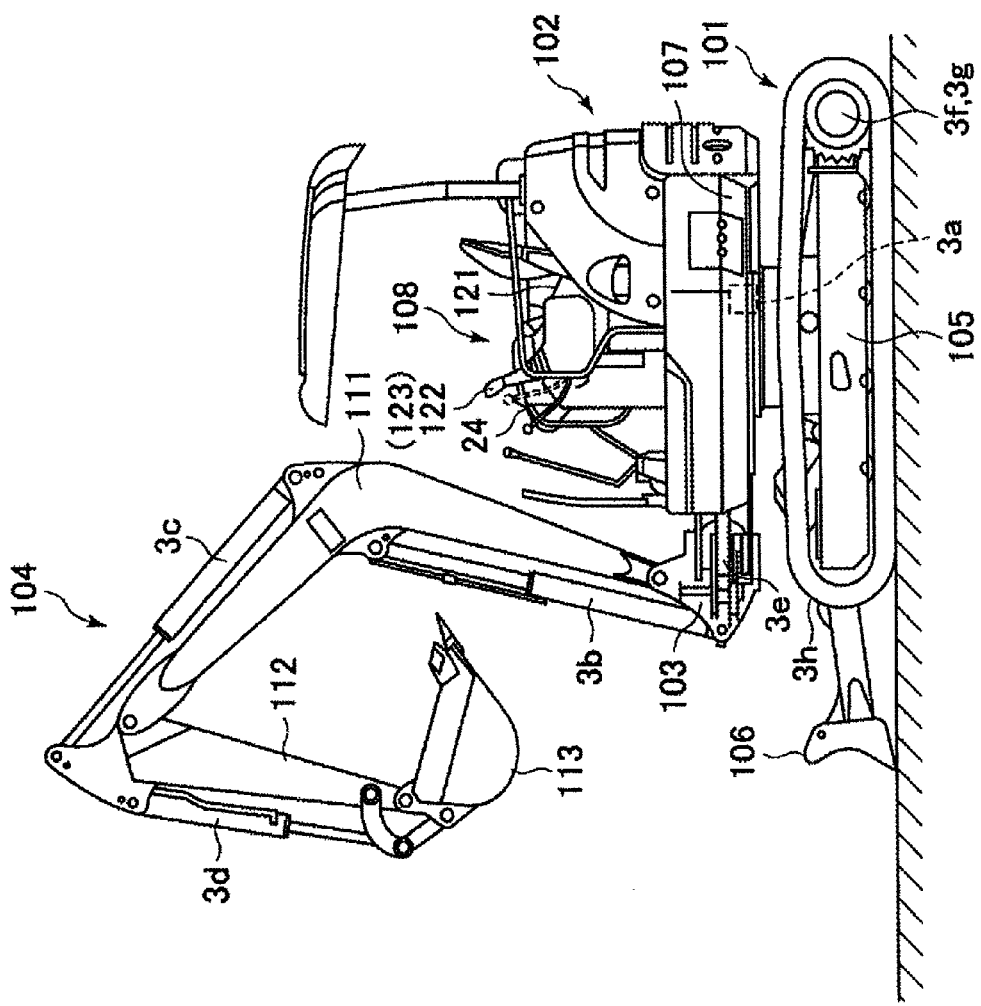
FIG. 2 is an illustration showing an appearance of a hydraulic excavator on which the hydraulic drive system according to the embodiment is mounted.

FIG. 2 is an illustration showing an appearance of a hydraulic excavator on which the hydraulic drive system according to the embodiment is mounted.

The hydraulic excavator includes a lower track structure 101, an upper turning structure 102 mounted rotatably on the lower track structure 101, and a front work implement 104 connected to a leading end portion of the upper turning structure 102 swingably in vertical and lateral directions via a swing post 103. The lower track structure 101 is a crawler type having a vertically movable earth-moving blade 106 disposed anterior to a track frame 105. The upper turning structure 102 includes a turning base 107 that assumes a foundation understructure and a canopy type cabin 108 on the turning base 107. The front work implement 104 includes a boom 111, an arm 112, and a bucket 113. The boom 111 has a proximal end pinned to the swing post 103 and a distal end pinned to a proximal end of the arm 112. The arm 112 has a distal end pinned to the bucket 113.

The upper turning structure 102 is rotatably driven by a turning motor 3a relative to the lower track structure 101. The boom 111, the arm 112, and the bucket 113 are rotated by extending and contracting a boom cylinder 3b, an arm cylinder 3c, and a bucket cylinder 3d, respectively. The lower track structure 101 is driven by left and right track motors 3f, 3g. The blade 106 is vertically driven by a blade cylinder 3h. FIG. 1 omits the bucket cylinder 3d, the left and right track motors 3f, 3g, the blade cylinder 3h, and circuit elements associated therewith.

The cabin 108 includes an operator's seat 121, the operating lever devices 122, 123 (only the right-hand side is shown in FIG. 2), and the gate lock lever 24.

Figure 3:
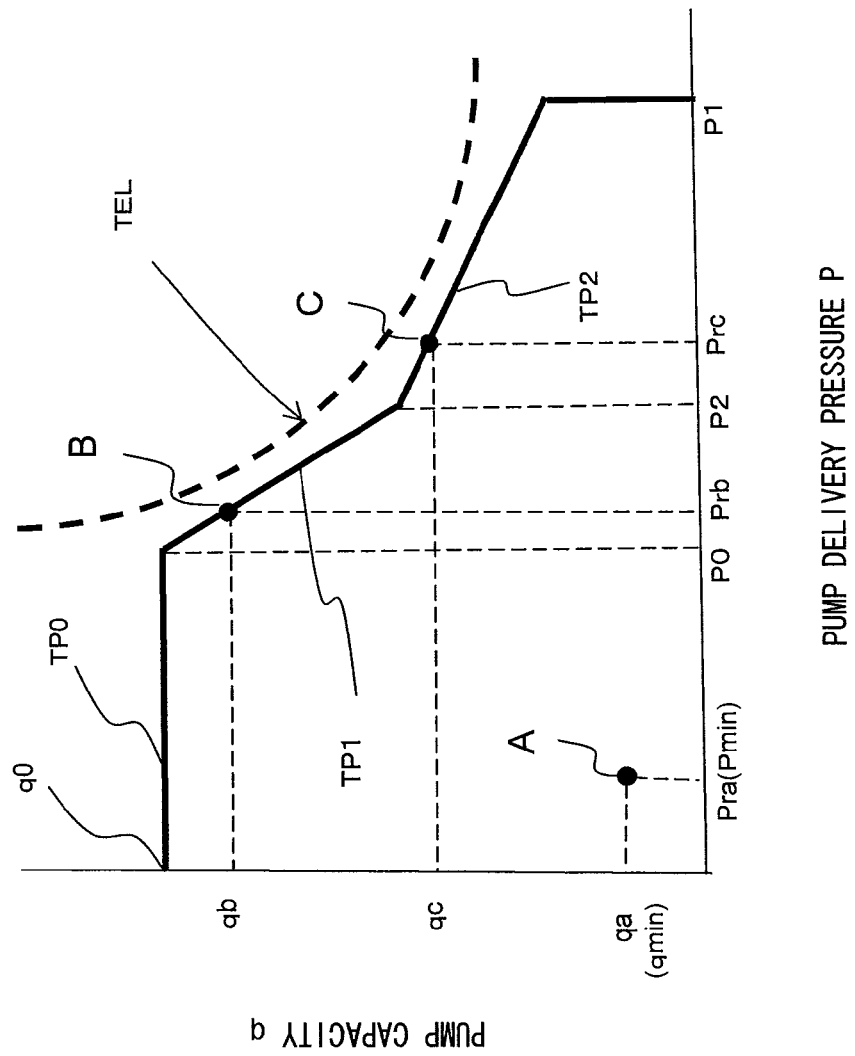
FIG. 3 is a graph showing a Pq (pressure-to-pump capacity) characteristic of a main pump provided with a torque control tilting piston.
Figure 4:
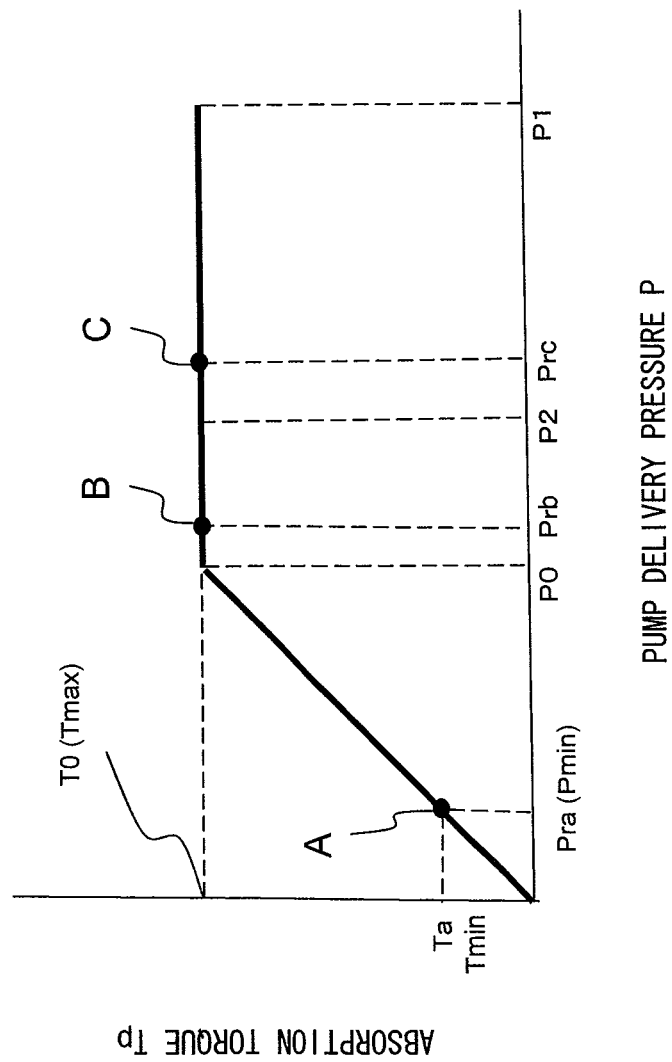
FIG. 4 is a graph showing an absorption torque characteristic of the main pump.

Torque control by the torque control section 17-1 will be described in detail with reference to FIGS. 3 and 4. FIG. 3 is a graph showing a relation between the delivery pressure and the capacity (tilting angle) of the main pump 2 by the torque control tilting piston 17a (hereinafter referred to as a Pq (pressure-to-pump capacity) characteristic). FIG. 4 is a graph showing an absorption torque characteristic of the main pump 2. In FIGS. 3 and 4, the abscissa represents delivery pressure P of the main pump 2. In FIG. 3, the ordinate represents capacity (or tiling angle) q of the main pump 2. In FIG. 4, the ordinate represents absorption torque Tp of the main pump 2.

In FIG. 3, the Pq characteristic of the main pump 2 includes a maximum capacity maintaining characteristic Tp0 and maximum absorption torque maintaining characteristics Tp1, Tp2.

When the delivery pressure P of the main pump 2 is a first value P0 (starting pressure of the absorption torque maintaining control) as pressure at a break point (transition point) at which the maximum capacity maintaining characteristic Tp0 shifts to the maximum absorption torque maintaining characteristics Tp1, Tp2 or lower, the maximum capacity of the main pump 2 remains constant at q0 even when the delivery pressure P of the main pump 2 increases. At this time, the maximum absorption torque of the main pump 2 that is a product of pump delivery pressure and pump capacity increases with an increase in the delivery pressure P of the main pump 2, as shown in FIG. 4. When the delivery pressure P of the main pump 2 increases to exceed the first value P0, the maximum capacity of the main pump 2 decreases along a characteristic line of the maximum absorption torque maintaining characteristics Tp1, Tp2 and the absorption torque of the main pump 2 is maintained at maximum torque Tmax determined by the characteristics Tp1, Tp2. The Tp1 and Tp2 characteristic lines are set by two springs not shown so as to approximate an absorption torque maintaining curve (hyperbola) and the maximum torque Tmax remains substantially constant. Additionally, the maximum torque Tmax is set so as to be smaller than the limiting torque TEL of the engine 1. Thus, when the delivery pressure P of the main pump 2 increases to exceed the first value P0, the maximum capacity of the main pump 2 is reduced to thereby prevent the absorption torque (input torque) of the main pump 2 from exceeding the maximum torque Tmax, so that the absorption torque of the main pump 2 does not exceed the limiting torque TEL of the engine 1. The control of the maximum absorption torque with the characteristics Tp1, Tp2 is referred to as the absorption torque maintaining control (absorption horsepower maintaining control, if the ordinate represents pump delivery flow rate).

Figure 5:
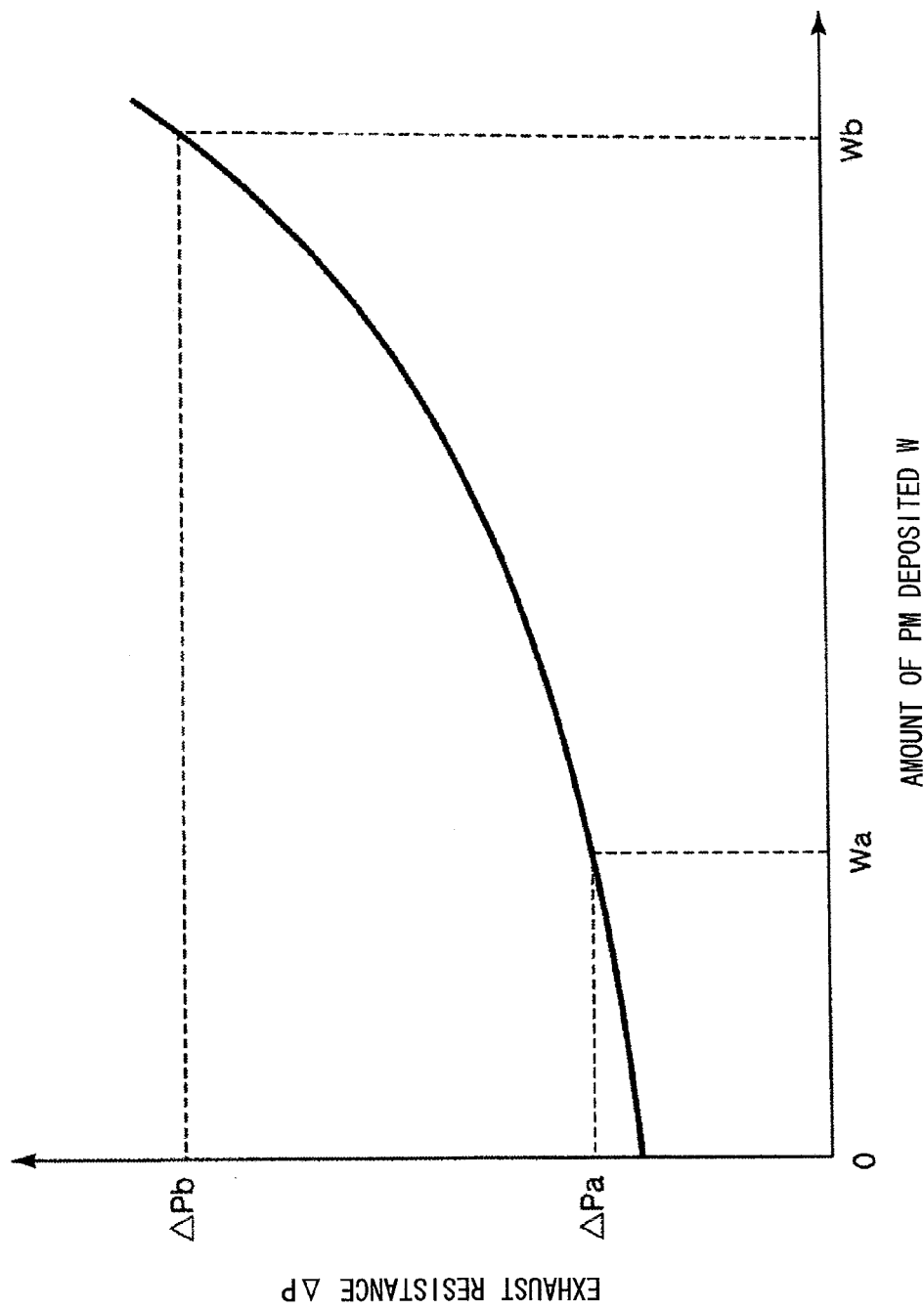
FIG. 5 is a graph showing a relation between an amount of PM deposits in an exhaust gas purifying device and exhaust resistance (differential pressure across a filter) detected by an exhaust resistance sensor.

FIG. 5 is a graph showing a relation between the amount of PM deposits in the exhaust gas purifying device 42 and the exhaust resistance (differential pressure across the filter) detected by the exhaust resistance sensor 43.

In FIG. 5, the exhaust resistance of the exhaust gas purifying device 42 increases with an increase in the amount of PM deposits in the exhaust gas purifying device 42. In the figure, Wb denotes the amount of PM deposits with which automatic regeneration control is required and ΔPb denotes the exhaust resistance when the amount of PM deposits is Wb. Additionally, Wa denotes the amount of PM deposits with which the regeneration control may be terminated and ΔPa denotes the exhaust resistance when the amount of PM deposits is Wa.

The controller 49 stores in its memory (not shown) ΔPb as a threshold value for starting the automatic regeneration control and ΔPa as a threshold value for terminating the regeneration control.

Figure 6:
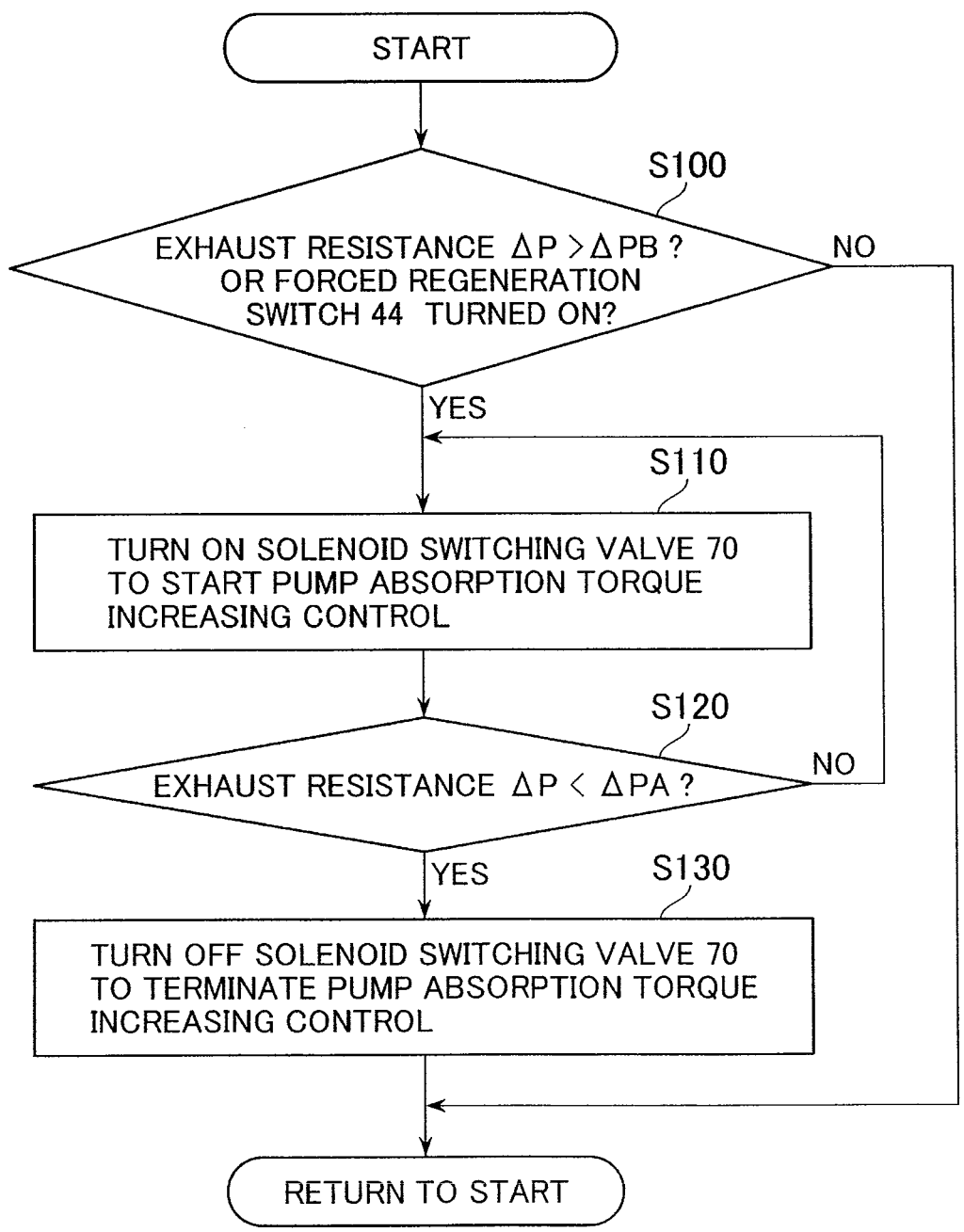
FIG. 6 is a flowchart showing processing functions performed by a controller.

FIG. 6 is a flowchart showing processing functions performed by the controller 49. Steps of regenerating the exhaust gas purifying device 42 performed by the controller 49 will be described with reference to FIG. 6.

Based on the detection signal from the exhaust resistance sensor 43 and the command signal from the forced regeneration switch 44, the controller 49 first compares exhaust resistance ΔP in the exhaust gas purifying device 42 with the threshold value ΔPb for starting the automatic regeneration control to thereby determine whether ΔP>ΔPb. The controller 49 further determines whether the forced regeneration switch 44 is turned ON from OFF position (step S100). If it is determined that ΔP>ΔPb or the forced regeneration switch 44 is turned ON, the next step is performed. If neither ΔP>ΔPb nor the forced regeneration switch 44 being turned ON holds, the controller 49 repeats the determining step without performing any other step.

If ΔP>ΔPb holds or the forced regeneration switch 44 is turned ON, the controller 49 turns ON an electric signal to be output to the solenoid switching valve 70, thereby switching the position of the solenoid switching valve 70 from that shown in the figure. This starts pump absorption torque increasing control (that corresponds to the related art pump output increasing control) (step S110). The pump absorption torque increasing control will be described in detail later. Additionally, the controller 49 performs a step of feeding unburned fuel to the exhaust gas. This step is performed by, for example, controlling an electronic governor (not shown) of the engine 1 to thereby perform post injection (additional injection) on an expansion stroke following engine main injection.

Starting the pump absorption torque increasing control causes hydraulic load on the engine 1 to increase and the exhaust gas temperature of the engine 1 to rise. This activates the oxidation catalyst disposed in the exhaust gas purifying device 42. Supplying the exhaust gas with the unburned fuel under these circumstances causes the activated oxidation catalyst to burn the unburned fuel and the exhaust gas temperature to be increased. Then, the exhaust gas at high temperature burns and removes the PM deposited on the filter.

It is noted that, a fuel injection device for regeneration control may be disposed in the exhaust pipe and is operated to feed the unburned fuel.

During the pump absorption torque increasing control, the controller 49 compares, based on the detection signal from the exhaust resistance sensor 43 disposed in the exhaust gas purifying device 42, the exhaust resistance ΔP in the exhaust gas purifying device 42 with the threshold value ΔPa for terminating the automatic regeneration control and determines whether ΔP<ΔPa (step S120); if ΔP<ΔPa does not hold, the controller 49 returns to step S110 and continues performing the pump absorption torque increasing control. When ΔP<ΔPa holds, the controller 49 turns OFF the electric signal to be output to the solenoid switching valve 70 to thereby switch the position of the solenoid switching valve 70 to that shown in the figure, thereby terminating the pump absorption torque increasing control (step S130). Additionally, the controller 49 simultaneously stops supplying the unburned fuel.

In the above, the exhaust resistance sensor 43, the forced regeneration switch 44, and the function of step S100 of FIG. 6 performed by the controller 49 constitute an instruction device that directs the start of regeneration of the exhaust gas purifying device 42.

Similarly, the pressure receiving portion 17d of the LS control valve 17b, the pressure receiving portion 15d of the unloading valve 15, the signal hydraulic line 35, the solenoid switching valve 70, and the function of step S110 of FIG. 6 performed by the controller 49 constitute a changeover control device that selects to enable or disable the load sensing control performed by the load sensing control section 17-2; specifically, the changeover control device enables the load sensing control of the load sensing control section 17-2 when the instruction device does not direct the start of the regeneration of the exhaust gas purifying device 42 and disables the load sensing control of the load sensing control section 17-2 when the instruction device directs the start of the regeneration of the exhaust gas purifying device 42, to thereby increase the capacity of the hydraulic pump 2. When disabling the load sensing control, the changeover control device guides predetermined pressure generated based on the delivery fluid of the pilot pump 30 (the delivery pressure of the pilot pump 30) to the unloading valve 15 to thereby increase the unloading set pressure.

Operation

The following describes operations of the embodiment including detailed descriptions of the pump absorption torque increasing control (pump output increasing control).

1. All operating levers are in their neutral positions and the solenoid switching valve 70 is OFF:

When all operating levers (operating levers, such as the operating lever devices 122, 123) are in their neutral positions and the determination in step S100 of FIG. 6 is in the negative, the solenoid switching valve 70 is in the position shown in the figure. With the solenoid switching valve 70 in the position shown in the figure, the solenoid switching valve 70 outputs the output pressure Pgr of the differential pressure reducing valve 13b to the signal hydraulic line 40a, so that the output pressure Pgr is guided to the pressure receiving portion 17d of the LS control valve 17b as the target differential pressure of the load sensing control and to the pressure receiving portion 15d of the unloading valve 15 via the signal hydraulic line 35. This sets the output pressure Pgr of the differential pressure reducing valve 13b as the target differential pressure of the load sensing control and the sum of the set pressure Pun0 of the spring 15a and the output pressure Pgr of the differential pressure reducing valve 13b as the target unloading pressure of the unloading valve 15.

As described earlier, if the pressure of the pilot hydraulic source 38 (pressure of the pilot line 31b) is 4.9 MPa, the output pressure Pgr of the differential pressure reducing valve 13b is 2.0 MPa, and the set pressure Pun0 of the spring 15a of the unloading valve 15 is 1 MPa, then the target differential pressure of the load sensing control is 2.0 MPa and the target unloading pressure of the unloading valve 15 (unloading set pressure) is 3.0 MPa.

Additionally, when all operating levers are in their neutral positions, the flow and directional control valves 6a, 6b, 6c . . . are held in their neutral positions shown in the figure and the pressure at their load ports 26a, 26b, 26c . . . is the tank pressure. As a result, the maximum load pressure detected by the shuttle valves 9a, 9b, 9c . . . is the tank pressure (assumed to be 0 MPa). The delivery pressure of the main pump 2 is controlled by the unloading valve 15 to a value of pressure that is a sum of the unloading set pressure of the unloading valve 15 and pressure generated by an override characteristic of the unloading valve 15. The output pressure of the differential pressure reducing valve 11 equals the delivery pressure of the main pump 2 (that is the sum of the unloading set pressure of the unloading valve 15 and the pressure generated by the override characteristic of the unloading valve 15). This output pressure is guided to the pressure receiving portion 17e of the LS control valve 17b.

As described earlier, when the target unloading pressure of the unloading valve 15 (unloading set pressure) is 3.0 MPa, the delivery pressure of the main pump 2 is slightly higher than 3.0 MPa and the output pressure of the differential pressure reducing valve 11 guided to the pressure receiving portion 17e of the LS control valve 17b is also slightly higher than 3.0 MPa.

Under this condition, the pressure guided to the pressure receiving portion 17e of the LS control valve 17b (that is slightly higher than 3.0 MPa) is higher than the pressure guided to the pressure receiving portion 15d of the unloading valve 15 (2 MPa) and the LS control valve 17b is placed in the right-hand side position shown in the figure. Operations of the hydraulic drive system at this time are the same as those of the related-art system and the tilting angle (capacity) of the main pump 2 is the minimum and the delivery flow rate thereof is the minimum. Additionally, the delivery pressure of the main pump 2 is the minimum pressure as controlled by the unloading valve 15. As a result, the absorption torque of the main pump 2 is the minimum.

Figure 7:
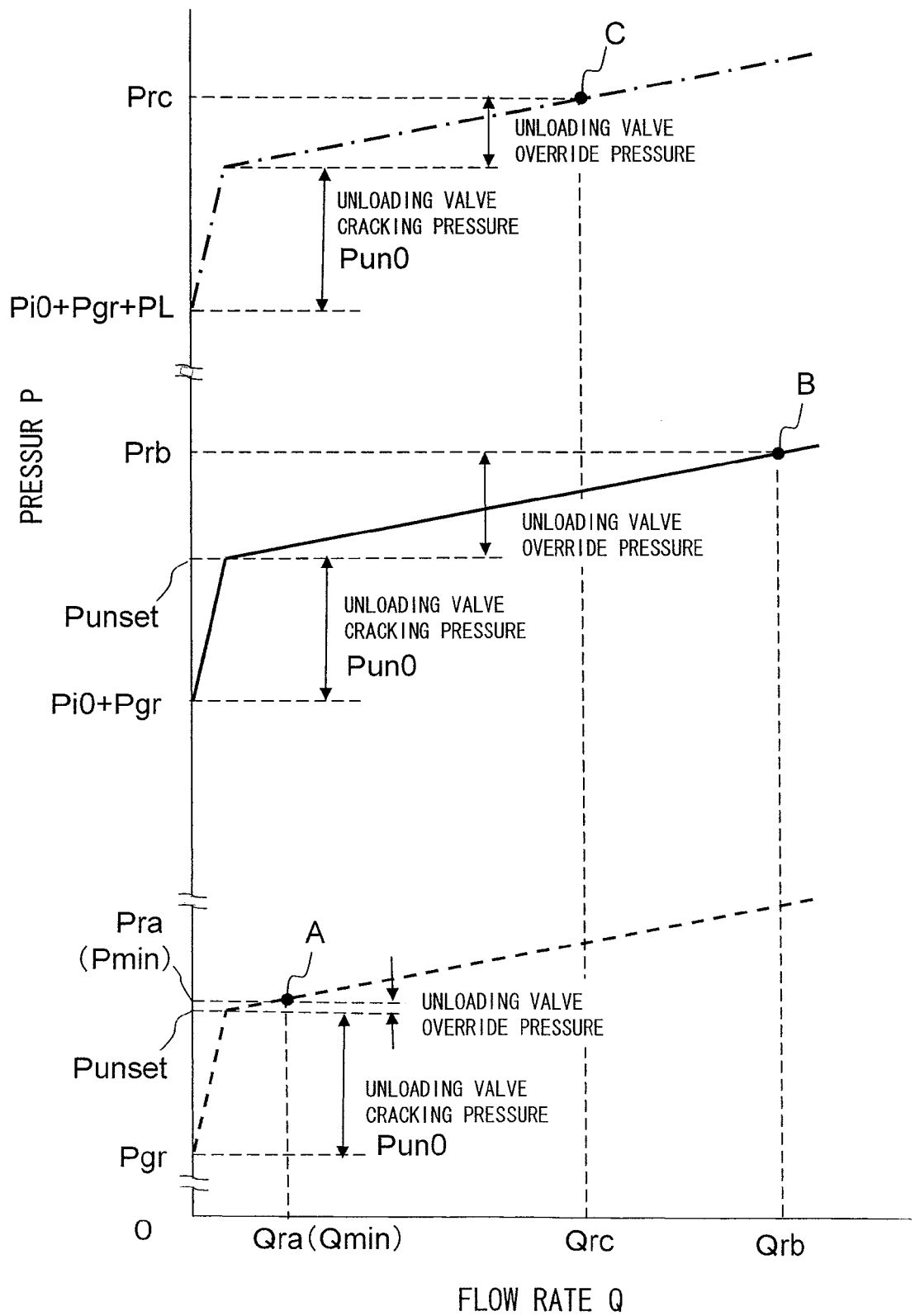
FIG. 7 is a graph showing operating characteristics of an unloading valve with tank pressure being assumed to be 0 MPa.

FIG. 7 is a graph showing operating characteristics of the unloading valve 15 with the tank pressure being assumed to be 0 MPa. In the figure, the broken line represents a relation between a flow rate in the hydraulic fluid supply lines 5, 4a (the delivery flow rate of the main pump 2) and pressure in the hydraulic fluid supply lines 5, 4a (the delivery pressure of the main pump 2) when all operating levers are in their neutral positions and the solenoid switching valve 70 is OFF and point A denotes an operating point. In the figure, Punset is the unloading set pressure of the unloading valve 15.

At operating point A, the delivery pressure of the main pump 2 is pressure Pra (minimum pressure Pmin) that is a sum of the unloading set pressure Punset of the unloading valve 15 (3.0 MPa) and the pressure generated by the override characteristic of the unloading valve 15 (override pressure) and the delivery flow rate of the main pump 2 is a minimum flow rate Qra (Qmin). The absorption torque of the main pump 2 at this time is minimum torque Ta (Tmin) indicated by point A in FIGS. 3 and 4. In FIG. 3, qa is minimum capacity qmin that corresponds to the minimum flow rate Qra (Qmin) of the main pump 2.

2. All operating levers are in their neutral positions and the solenoid switching valve 70 is ON:

If regeneration of the exhaust gas purifying device 42 becomes necessary when all operating levers (operating levers, such as the operating lever devices 122, 123) are in their neutral positions and the determination in step S100 of FIG. 6 is in the affirmative, the solenoid switching valve 70 is switched from the position shown in the figure by an ON electric signal.

When the solenoid switching valve 70 is switched from the position shown in the figure, the solenoid switching valve 70 outputs the delivery pressure of the pilot pump 30 to the signal hydraulic line 40a, so that the delivery pressure of the pilot pump 30 is guided to the pressure receiving portion 17d of the LS control valve 17b and to the pressure receiving portion 15d of the unloading valve 15 via the signal hydraulic line 35. This sets a sum of the set pressure Pun0 of the spring 15a and the delivery pressure of the pilot pump 30 as the target unloading pressure of the unloading valve 15.

As described earlier, if the pressure of the pilot hydraulic source 38 (pressure of the pilot line 31b) is 4.9 MPa, the output pressure Pgr of the differential pressure reducing valve 13b is 2.0 MPa, and the set pressure Pun0 of the spring 15a of the unloading valve 15 is 1 MPa, then the delivery pressure of the pilot pump 30 is 4.9 MPa plus 2.0 MPa, specifically, 6.9 MPa, the pressure guided to the pressure receiving portion 17d of the LS control valve 17b is 6.9 MPa, and the target unloading pressure (unloading set pressure) of the unloading valve 15 is 7.9 MPa.

When all operating levers are in their neutral positions, the maximum load pressure is the tank pressure (assumed to be 0 MPa) as described earlier. The delivery pressure of the main pump 2 is controlled by the unloading valve 15 to the value of pressure that is the sum of the unloading set pressure of the unloading valve 15 and the pressure generated by the override characteristic of the unloading valve 15. The output pressure of the differential pressure reducing valve 11 equals the delivery pressure of the main pump 2 (that is the sum of the unloading set pressure of the unloading valve 15 and the pressure generated by the override characteristic of the unloading valve 15). It is noted that the differential pressure reducing valve 11 generates, as an absolute pressure, the differential pressure between the delivery pressure of the main pump 2 and the maximum load pressure using the pressure of the pilot hydraulic source 38 as a source pressure (primary pressure). Thus, the output pressure of the differential pressure reducing valve 11 cannot be higher than the pressure of the pilot hydraulic source 38. Meanwhile, the delivery pressure of the pilot pump 30 guided to the pressure receiving portion 17d of the LS control valve 17b is higher than the pressure of the pilot hydraulic source 38 and, in the above example, the delivery pressure of the pilot pump 30 is 6.9 MPa and the pressure of the pilot hydraulic source 38 (pressure of the pilot line 31b) is 4.9 MPa. The pressure of the pilot hydraulic source 38 (4.9 MPa) is guided as the output pressure of the differential pressure reducing valve 11 to the pressure receiving portion 17e of the LS control valve 17b. This changes the position of the LS control valve 17b to the left-hand side shown in the figure. Then, the loading sensing control is disabled and the hydraulic fluid of the LS control tilting piston 17c is returned to the tank T via the LS control valve 17b. The tilting angle (capacity) of the main pump 2 is then increased by spring tension and the delivery flow rate of the main pump 2 increases.

The solid line in FIG. 7 represents a relation between the flow rate in the hydraulic fluid supply lines 5, 4a (the delivery flow rate of the main pump 2) and the pressure in the hydraulic fluid supply lines 5, 4a (the delivery pressure of the main pump 2) when all operating levers are in their neutral positions and the solenoid switching valve 70 is ON and point B denotes an operating point.

At operating point B, the delivery pressure of the main pump 2 is pressure Prb that is a sum of the unloading set pressure Punset of the unloading valve 15 (7.9 MPa) and the pressure generated by the override characteristic of the unloading valve 15 (override pressure). The override pressure of the unloading valve 15 at this time is about 2.0 MPa. In this case, the delivery pressure Prb of the main pump 2 reaches about 10 MPa. Additionally, the delivery flow rate of the main pump 2 increases up to Qrb at the operating point B.

Reference is now made to the Pq (pressure-to-pump capacity) characteristic of the main pump 2 shown in FIG. 3. In general, with the construction machine, such as the hydraulic excavator, the starting pressure P0 of the absorption torque maintaining control is often set to about 10 MPa. This results in the delivery pressure of the main pump (Prb in FIGS. 3, 4, and 7) when the solenoid switching valve 70 is switched from the position shown in the figure being pressure near the break point of the Pq characteristic of the main pump 2. As shown by point B in FIG. 3, the capacity of the main pump 2 is a value qb that is determined by the absorption torque maintaining control by the torque control tilting piston 17a. In addition, the absorption torque of the main pump 2 at this time is the maximum torque Tmax as shown by point B in FIG. 4.

The absorption torque of the main pump 2 is increased up to the maximum torque Tmax of the absorption torque maintaining control by changing the position of the solenoid switching valve 70. The pump absorption torque increasing control at the maximum torque Tmax can thereby be performed using the absorption torque maintaining control by the torque control tilting piston 17a.

The increase in the absorption torque of the main pump 2 results in increased load on the engine 1 and an increased exhaust temperature. This activates the oxidation catalyst of the exhaust gas purifying device 42. Thus, as described earlier, the supply of the unburned fuel to the exhaust gas causes the activated oxidation catalyst to burn the unburned fuel, resulting in an increased exhaust gas temperature. The resultant exhaust gas at high temperature burns and removes the PM deposited on the filter.

The pump absorption torque increasing control continues until the exhaust resistance $\Delta P$ in the exhaust gas purifying device 42 detected by the exhaust resistance sensor 43 disposed in the exhaust gas purifying device 42 is smaller than the threshold value $\Delta Pa$.

3. An operating lever is operated with the solenoid switching valve 70 ON:

The following describes a case in which an operating lever is operated during regeneration with the solenoid switching valve 70 ON.

When any given actuator, for example, the boom operating lever is operated, the flow and directional control valve 6b changes its position, so that the hydraulic fluid is supplied to the boom cylinder 3b and the boom cylinder 3b is operated. At this time, the load port 26b of the flow and directional control valve 6b develops a load pressure of the boom cylinder 3b. As a result, the maximum load pressure detected by the shuttle valves 9a, 9b, 9c . . . is the load pressure of the boom cylinder 3b and the load pressure is guided to the pressure receiving portion 15c of the unloading valve 15.

During the pump absorption torque increasing control, the delivery pressure Prb of the main pump 2 is close to the starting pressure P0 of the absorption torque maintaining control as described earlier and the delivery flow rate of the main pump 2 at this time is close to a maximum flow rate Qrmax that corresponds to the maximum capacity q0. Meanwhile, most of the actuators have a maximum flow rate requirement set lower than the maximum flow rate of the main pump 2. When the operating lever is operated to move the boom cylinder 3b during the pump absorption torque increasing control, therefore, an excess of the delivery flow rate of the main pump 2 is produced and the excess is returned to the tank via the unloading valve 15. Thus, the delivery pressure of the main pump 2 increases according to the load pressure of the boom cylinder 3 because of functioning of the unloading valve 15. Therefore, at this time, too, the absorption torque maintaining control by the torque control tilting piston 17a (torque control section) controls to keep the absorption torque of the main pump 2 below the maximum torque Tmax. As indicated by point C in FIG. 3, the capacity of the main pump 2 is a value qc as determined through the absorption torque maintaining control by the torque control tilting piston 17a and the delivery flow rate of the main pump 2 is Qrc indicated by point C in FIG. 7. The same pump absorption torque increasing control as that before the actuator is operated can thus be performed without being affected by the actuator operation.

The same operations apply also when the operating levers for the arm, the bucket, and the turning motion are operated.

The flow rate requirement for the track motors 3f, 3g during steady state traveling or the flow rate requirement when two or more of the actuators 3a to 3d are simultaneously operated with the operating levers for the front system in, for example, excavating work may at times be greater than the delivery flow rate of the main pump 2 during the pump output increasing control. However, the load pressure during traveling or the load pressure for combined operations involving the front system in which the flow rate requirement is greater than the delivery flow rate of the hydraulic pump during the pump output increasing control is high, so that the delivery pressure of the main pump 2 is higher than the starting pressure of the absorption torque maintaining control. Thus, in this case, too, the absorption torque of the main pump 2 is controlled so as not to exceed the maximum torque Tmax by the absorption torque maintaining control by the torque control section 17-1. The same pump output increasing control as that before the actuators are operated can thus be performed without being affected by the actuator operation.

As described above, when the operating levers are used to operate the actuators during the regeneration of the exhaust gas purifying device 42, the pump absorption torque increasing control using the absorption torque maintaining control can be performed similarly as when the actuators are not operated, so that the load on the engine 1 can be increased to obtain a higher exhaust temperature.

Effects

The embodiment achieves the following effects.

1. When the exhaust gas purifying device 42 requires regeneration as a result of an increased amount of PM deposited on the filter of the exhaust gas purifying device 42, the solenoid switching valve 70 changes its position and the delivery pressure (predetermined pressure) of the pilot pump 30 is guided to the pressure receiving portion 17d of the LS control valve 17b and the pressure receiving portion 15d of the unloading valve 15. Thus, even when none of the actuators is operated with all operating levers in their neutral positions, the absorption torque of the main pump 2 increases up to the maximum torque Tmax of the absorption torque maintaining control by the torque control tilting piston 17a, enabling the pump absorption torque increasing control (pump output increasing control) using the absorption torque maintaining control to be performed. This increases the load on the engine 1 and thus increases the exhaust temperature, so that the deposits on the filter in the exhaust gas purifying device 42 can be efficiently burned and removed.

2. Even if an operating lever is used to operate an actuator during the pump absorption torque increasing control, causing the hydraulic fluid delivered from the main pump 2 to flow into the actuator, the delivery flow rate of the main pump 2 is close to its maximum level during the pump absorption torque increasing control. Thus, an excess of the delivery flow rate of the main pump 2 is returned to the tank via the unloading valve 15 and the delivery pressure of the main pump 2 increases according to the load pressure of the boom cylinder 3 because of functioning of the unloading valve 15. Then, the main pump 2 operates within the range of the absorption torque maintaining control by the torque control section 17-1 and the same pump output increasing control as that before the actuator is operated can be performed without being affected by the actuator operation.

3. When the start of regeneration is directed, the delivery pressure of the pilot pump 30 is guided as predetermined pressure to the pressure receiving portion 15d of the unloading valve 15 to thereby increase the unloading set pressure. This eliminates the need for a dedicated hydraulic device for generating the predetermined pressure. The hydraulic drive system can thus have simple arrangements and be achieved at low cost.

4. A simple structure that guides the delivery pressure of the pilot pump 30 to the pressure receiving portion 17d of the LS control valve 17b, the pressure receiving portion 17d being operative in the direction in which pump capacity increases, can disable the load sensing control and increase the capacity of the main pump 2. The hydraulic drive system can thus be simply structured and achieved at low cost.

5. A simple structure that switches only one solenoid switching valve 70 enables switching from normal control to the pump absorption torque increasing control. The hydraulic drive system can thus be simply structured and achieved at low cost.

6. The unloading pressure of the unloading valve 15 is set to be divided between the spring 15a and the pressure receiving portion 15d. This improves cold engine startability.

Specifically, when the engine 1 is started, the delivery pressure of the main pump 2 increases to a level that is a sum of the unloading set pressure of the unloading valve 15 and the override pressure of the unloading valve 15, because the main pump 2 is driven by the engine 1. When work is performed in winter or in cold regions, viscosity of the hydraulic fluid increases at low temperatures. This significantly increases the override pressure of the unloading valve 15 to thereby further increase the delivery pressure of the main pump 2. This delivery pressure of the main pump 2 is an engine load during engine starting. In related-art loading sensing hydraulic drive systems, the unloading pressure of the unloading valve 15 is generally set only with a spring. The set pressure is, for example, 3 MPa, as in the setting example of the present embodiment described above. As a result, when the engine 1 is started at low temperatures, the delivery pressure of the main pump 2 is the sum of 3.0 MPa as the unloading set pressure of the spring and the override pressure increased as a result of an increase in viscosity increased by low temperatures. This increases the engine load, thus aggravating engine startability.

In contrast, in the present embodiment, the unloading pressure of the unloading valve 15 is set to be divided between the spring 15a and the pressure receiving portion 15d (the set pressure for the spring 15a accounts for 1 MPa) and the pressure of the pressure receiving portion 15d before the engine is started is the tank pressure. Thus, the delivery pressure of the main pump 2 when the engine 1 is started at low temperatures is only the sum of 1.0 MPa that represents the set pressure for the spring and the pressure corresponding to the resistance for the increase in viscosity increased due to the low temperature. The load on the engine 1 is thus smaller than that in the related-art systems and engine startability at low temperatures can be improved.

Miscellaneous Embodiments

Various changes in form and detail may be made in the embodiment described heretofore within the scope of the spirit of the present invention.

For example, the embodiment described above includes the engine speed detecting valve 13 that generates a hydraulic signal to serve as the target differential pressure guided to the pressure receiving portion 17d of the LS control valve 17b. A possible arrangement may not include the engine speed detecting valve 13 and include a spring in place of the pressure receiving portion 17d of the LS control valve 17b, so that the target differential pressure may be set with this spring. In this case, the arrangement includes a simple throttle (fixed throttle) in place of the engine speed detecting valve 13. Then, the fixed throttle and the pilot relief valve 32 of the pilot hydraulic source increase the delivery pressure of the pilot pump 30 to the "predetermined pressure"; when the start of regeneration is directed, this pressure is to be guided to the pressure receiving portion 15d of the unloading valve 15.

A solenoid switching valve may be disposed in the signal hydraulic line 12b and, when the start of regeneration is directed, this solenoid switching valve is switched to bring the pressure receiving portion 17e of the LS control valve 17b into communication with the tank. Thereby the load sensing control is disabled and the capacity of the main pump 2 may be increased.

In the embodiment described earlier, the output pressure of the differential pressure reducing valve 11 (the absolute pressure of the differential pressure between the delivery pressure of the main pump 2 and the maximum load pressure) is guided to the pressure compensating valves 7a, 7b, 7c . . . and the LS control valve 17b. However, the delivery pressure of the main pump 2 and the maximum load pressure may be guided separately to the pressure compensating valves 7a, 7b, 7c . . . and the LS control valve 17b.

The above-described embodiment has been described for a case in which the construction machine is a hydraulic excavator. The present invention can nonetheless be applied to a construction machine of any type other than the hydraulic excavator (e.g., a hydraulic crane and a wheel type excavator) and the same effects can be achieved as those in the above-described embodiment, as long as such a construction machine includes a hydraulic drive system that performs the load sensing control and the torque control, as well as a diesel engine and an exhaust gas purifying device.

DESCRIPTION OF REFERENCE NUMERALS

1 Engine
2 Hydraulic pump (main pump)
3a, 3b, 3c Actuator
4 Control valve
4a Second hydraulic fluid supply line
5 First hydraulic fluid supply line
6a, 6b, 6c Flow and directional control valve
7a, 7b, 7c Pressure compensating valve
8a, 8b, 8c Line
9a, 9b, 9c Shuttle valve (maximum load pressure detecting circuit)
11 Differential pressure reducing valve
12a, 12b Signal hydraulic line
13a Variable throttle valve
13b Differential pressure reducing valve
14 Main relief valve
15 Unloading valve
15a Spring
15b to 15d Pressure receiving portion
17 Pump control device
17-1 Torque control section
17-2 Load sensing control section
17a Torque control tilting piston
17b LS control valve
17c LS control tilting piston
17d, 17e Pressure receiving portion
24 Gate lock lever
26a, 26b, 26c . . . Load port (maximum load pressure detecting circuit)
27, 27a Signal hydraulic line
30 Pilot pump
31 Pilot line
31a to 31c Pilot line
32 Pilot relief valve
33, 34 Line
35 Signal hydraulic line
38 Pilot hydraulic source
40, 40a Signal hydraulic line
41 Exhaust line
42 Exhaust gas purifying device
43 Exhaust resistance sensor
44 Forced regeneration switch 49 Controller (control device)
70 Solenoid switching valve
100 Gate lock valve
122, 123 Operating lever device

The invention claimed is:

1. A construction machine hydraulic drive system comprising:
an engine;
a variable displacement hydraulic pump driven by the engine;
a plurality of actuators driven by hydraulic fluid delivered from the hydraulic pump;
a plurality of flow and directional control valves that control a flow rate of the hydraulic fluid supplied from the hydraulic pump to the actuators;
a pump control device including: a torque control section that performs absorption torque maintaining control that prevents absorption torque of the hydraulic pump from exceeding a predetermined maximum torque by reducing a capacity of the hydraulic pump as a delivery pressure of the hydraulic pump increases; and a load sensing control section that performs load sensing control that ensures that the delivery pressure of the hydraulic pump is higher than maximum load pressure of the actuators by a target differential pressure;
an unloading valve connected to a line to which a delivery fluid from the hydraulic pump is guided, the unloading valve opening when the delivery pressure of the hydraulic pump is higher than a sum of the maximum load pressure and an unloading set pressure, to thereby return the delivery fluid of the hydraulic pump to a tank, thus restricting an increase in the delivery pressure of the hydraulic pump; and
a pilot pump driven by the engine;
an exhaust gas purifying device that purifies exhaust gases from the engine;
an instruction device that directs a start of regeneration of the exhaust gas purifying device; and
a changeover control device that selects to enable or disable the load sensing control performed by the load sensing control section by enabling the load sensing control of the load sensing control section when the instruction device does not direct a start of the regeneration of the exhaust gas purifying device and disabling the load sensing control of the load sensing control section when the instruction device directs the start of the regeneration of the exhaust gas purifying device to thereby increase the capacity of the hydraulic pump,
wherein the disabling of the load sensing control by the changeover control device includes guiding a predetermined pressure generated based on the delivery fluid of the pilot pump to the unloading valve to thereby increase the unloading set pressure.

2. The construction machine hydraulic drive system according to claim 1, further comprising:
a pilot hydraulic source connected to the pilot pump, the pilot hydraulic source generating a pilot primary pressure based on the delivery fluid of the pilot pump; and
an engine speed detecting valve disposed between the pilot pump and the pilot hydraulic source, the engine speed detecting valve generating a hydraulic signal dependent on a speed of the engine based on the delivery fluid of the pilot pump, wherein
the load sensing control section of the pump control device includes an LS a load sensing control valve that includes a first pressure receiving portion to which the hydraulic signal of the engine speed detecting valve is guided, the first pressure receiving portion being operative in a direction in which pump capacity increases to thereby set target differential pressure of the load sensing control using the hydraulic signal,
wherein the unloading valve includes a spring operative in a closing direction and a pressure receiving portion operative in a closing direction to cooperate with the spring and set an unloading set pressure, and
wherein the changeover control device guides the hydraulic signal generated by the engine speed detecting valve to the pressure receiving portion of the unloading valve when the instruction device does not direct the start of the regeneration of the exhaust gas purifying device, and guides the delivery pressure of the pilot pump to the pressure receiving portion of the unloading valve as the predetermined pressure when the instruction device directs the start of the regeneration of the exhaust gas purifying device.

3. The construction machine hydraulic drive system according to claim 2, further comprising:
a differential pressure reducing valve that generates and outputs differential pressure between the delivery pressure of the hydraulic pump and the maximum load pressure, with the hydraulic pressure of the pilot hydraulic source as a primary pressure, as an absolute pressure to the pump control device, wherein
the LS control valve further includes a second pressure receiving portion operative in a direction in which the pump capacity decreases, the second pressure receiving portion receiving the absolute pressure output from the differential pressure reducing valve guided thereto, and
when the instruction device directs the start of the regeneration of the exhaust gas purifying device, the changeover control device guides the delivery pressure of the pilot pump instead of the hydraulic signal of the engine speed detecting valve to the first pressure receiving portion of the LS control valve to thereby disable the load sensing control, thus controlling to increase the capacity of the hydraulic pump.

4. The construction machine hydraulic drive system according to claim 3, wherein the changeover control device includes a single switching valve that changes a position thereof so that, when the instruction device does not direct the start of the regeneration of the exhaust gas purifying device, the hydraulic signal of the engine speed detecting valve is guided to the first pressure receiving portion of the LS control valve and the pressure receiving portion of the unloading valve and, when the instruction device directs the start of the regeneration of the exhaust gas purifying device, the delivery pressure of the pilot pump is guided to the first pressure receiving portion of the LS control valve and the pressure receiving portion of the unloading valve.

5. The construction machine hydraulic drive system according to claim 1, further comprising:
a pressure detecting device that detects exhaust resistance in the exhaust gas purifying device, wherein
the instruction device directs the start of the regeneration of the exhaust gas purifying device when the exhaust resistance of the exhaust gas purifying device detected by the pressure detecting device exceeds a threshold value.

6. The construction machine hydraulic drive system according to claim 1, wherein
the torque control section of the pump control device is configured so as to control the capacity of the hydraulic pump so that, with characteristics set in advance, the characteristics indicating a relation between the delivery pressure and the capacity of the hydraulic pump and comprising a maximum capacity maintaining characteristic and a maximum absorption torque maintaining characteristic, when the delivery pressure of the hydraulic pump is equal to, or lower than, a first value as a pressure at a transition point from the maximum capacity maintaining characteristic to the maximum absorption torque maintaining characteristic, the maximum capacity of the hydraulic pump is made to remain constant even when the delivery pressure of the hydraulic pump increases, and when the delivery pressure of the hydraulic pump increases to exceed the first value, the maximum capacity of the hydraulic pump decreases according to the maximum absorption torque maintaining characteristic, and the predetermined pressure is set so that a sum of the unloading set pressure of the unloading valve increased by the predetermined pressure and pressure generated by an override characteristic of the unloading valve is a value equal to, or greater than, a pressure near the transition point from the maximum capacity maintaining characteristic to the maximum absorption torque maintaining characteristic.

7. The construction machine hydraulic drive system according to claim 2, further comprising:

a pressure detecting device that detects exhaust resistance in the exhaust gas purifying device, wherein the instruction device directs the start of the regeneration of the exhaust gas purifying device when the exhaust resistance of the exhaust gas purifying device detected by the pressure detecting device exceeds a threshold value.

8. The construction machine hydraulic drive system according to claim 3, further comprising:

a pressure detecting device that detects exhaust resistance in the exhaust gas purifying device, wherein the instruction device directs the start of the regeneration of the exhaust gas purifying device when the exhaust resistance of the exhaust gas purifying device detected by the pressure detecting device exceeds a threshold value.

9. The construction machine hydraulic drive system according to claim 4, further comprising:

a pressure detecting device that detects exhaust resistance in the exhaust gas purifying device, wherein the instruction device directs the start of the regeneration of the exhaust gas purifying device when the exhaust resistance of the exhaust gas purifying device detected by the pressure detecting device exceeds a threshold value.

10. The construction machine hydraulic drive system according to claim 2, wherein the torque control section of the pump control device is configured so as to control the capacity of the hydraulic pump so that, with characteristics set in advance, the characteristics indicating a relation between the delivery pressure and the capacity of the hydraulic pump and comprising a maximum capacity maintaining characteristic and a maximum absorption torque maintaining characteristic, when the delivery pressure of the hydraulic pump is equal to, or lower than, a first value as a pressure at a transition point from the maximum capacity maintaining characteristic to the maximum absorption torque maintaining characteristic, the maximum capacity of the hydraulic pump is made to remain constant even when the delivery pressure of the hydraulic pump increases, and when the delivery pressure of the hydraulic pump increases to exceed the first value, the maximum capacity of the hydraulic pump decreases according to the maximum absorption torque maintaining characteristic, and the predetermined pressure is set so that a sum of the unloading set pressure of the unloading valve increased by the predetermined pressure and pressure generated by an override characteristic of the unloading valve is a value equal to, or greater than, a pressure near the transition point from the maximum capacity maintaining characteristic to the maximum absorption torque maintaining characteristic.

11. The construction machine hydraulic drive system according to claim 3, wherein the torque control section of the pump control device is configured so as to control the capacity of the hydraulic pump so that, with characteristics set in advance, the characteristics indicating a relation between the delivery pressure and the capacity of the hydraulic pump and comprising a maximum capacity maintaining characteristic and a maximum absorption torque maintaining characteristic, when the delivery pressure of the hydraulic pump is equal to, or lower than, a first value as a pressure at a transition point from the maximum capacity maintaining characteristic to the maximum absorption torque maintaining characteristic, the maximum capacity of the hydraulic pump is made to remain constant even when the delivery pressure of the hydraulic pump increases, and when the delivery pressure of the hydraulic pump increases to exceed the first value, the maximum capacity of the hydraulic pump decreases according to the maximum absorption torque maintaining characteristic, and the predetermined pressure is set so that a sum of the unloading set pressure of the unloading valve increased by the predetermined pressure and pressure generated by an override characteristic of the unloading valve is a value equal to, or greater than, a pressure near the transition point from the maximum capacity maintaining characteristic to the maximum absorption torque maintaining characteristic.

12. The construction machine hydraulic drive system according to claim 4, wherein the torque control section of the pump control device is configured so as to control the capacity of the hydraulic pump so that, with characteristics set in advance, the characteristics indicating a relation between the delivery pressure and the capacity of the hydraulic pump and comprising a maximum capacity maintaining characteristic and a maximum absorption torque maintaining characteristic, when the delivery pressure of the hydraulic pump is equal to, or lower than, a first value as a pressure at a transition point from the maximum capacity maintaining characteristic to the maximum absorption torque maintaining characteristic, the maximum capacity of the hydraulic pump is made to remain constant even when the delivery pressure of the hydraulic pump increases, and when the delivery pressure of the hydraulic pump increases to exceed the first value, the maximum capacity of the hydraulic pump decreases according to the maximum absorption torque maintaining characteristic, and the predetermined pressure is set so that a sum of the unloading set pressure of the unloading valve increased by the predetermined pressure and pressure generated by an override characteristic of the unloading valve is a value equal to, or greater than, a pressure near the transition point from the maximum capacity maintaining characteristic to the maximum absorption torque maintaining characteristic.

13. The construction machine hydraulic drive system according to claim 5, wherein
the torque control section of the pump control device is configured so as to control the capacity of the hydraulic pump so that, with characteristics set in advance, the characteristics indicating a relation between the delivery pressure and the capacity of the hydraulic pump and comprising a maximum capacity maintaining characteristic and a maximum absorption torque maintaining characteristic, when the delivery pressure of the hydraulic pump is equal to, or lower than, a first value as a pressure at a transition point from the maximum capacity maintaining characteristic to the maximum absorption torque maintaining characteristic, the maximum capacity of the hydraulic pump is made to remain constant even when the delivery pressure of the hydraulic pump increases, and when the delivery pressure of the hydraulic pump increases to exceed the first value, the maximum capacity of the hydraulic pump decreases according to the maximum absorption torque maintaining characteristic, and
the predetermined pressure is set so that a sum of the unloading set pressure of the unloading valve increased by the predetermined pressure and pressure generated by an override characteristic of the unloading valve is a value equal to, or greater than, a pressure near the transition point from the maximum capacity maintaining characteristic to the maximum absorption torque maintaining characteristic.

* * * * *